(12) United States Patent
Higuchi et al.

(10) Patent No.: US 7,325,830 B2
(45) Date of Patent: Feb. 5, 2008

(54) AIRBAG DEVICE FOR VEHICLES

(75) Inventors: Hitoshi Higuchi, Wako (JP); Nobuyuki Kawamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/470,063

(22) Filed: Sep. 5, 2006

(65) Prior Publication Data

US 2007/0052222 A1   Mar. 8, 2007

(30) Foreign Application Priority Data

Sep. 5, 2005 (JP) ............................. 2005-255989
Sep. 30, 2005 (JP) ............................. 2005-288979
Feb. 10, 2006 (JP) ............................. 2006-033646

(51) Int. Cl.
*B60R 21/30* (2006.01)
*B60R 21/16* (2006.01)

(52) U.S. Cl. .................. 280/738; 280/739; 280/743.1

(58) Field of Classification Search ............... 280/731, 280/738, 739, 743.1, 729
See application file for complete search history.

(56) References Cited

U.S. PATENT DOCUMENTS

| | | | | |
|---|---|---|---|---|
| 3,840,246 | A | * | 10/1974 | McCullough et al. ....... 280/738 |
| 3,883,154 | A | * | 5/1975 | McCullough et al. ....... 280/735 |
| 5,007,662 | A | * | 4/1991 | Abramczyk et al. ........ 280/739 |
| 5,193,847 | A | * | 3/1993 | Nakayama ................... 280/738 |
| 5,226,670 | A | * | 7/1993 | Wright et al. ............... 280/738 |
| 5,405,166 | A | * | 4/1995 | Rogerson .................... 280/739 |
| 5,538,279 | A | * | 7/1996 | Link et al. .................. 280/739 |
| 5,542,695 | A | * | 8/1996 | Hanson ....................... 280/729 |
| 5,772,238 | A | * | 6/1998 | Breed et al. ............. 280/728.2 |
| 6,517,109 | B1 | * | 2/2003 | Van Poppel ............. 280/743.1 |
| 6,554,313 | B2 | * | 4/2003 | Uchida ........................ 280/729 |
| 6,588,795 | B2 | * | 7/2003 | Fischer et al. ............. 280/736 |
| 7,128,337 | B2 | * | 10/2006 | Kwon ..................... 280/743.1 |
| 2006/0043709 | A1 | * | 3/2006 | Asai et al. .................. 280/732 |

FOREIGN PATENT DOCUMENTS

| | | |
|---|---|---|
| JP | 9-076866 | 3/1997 |
| JP | 2000-118341 | 4/2000 |
| JP | 3275771 | 2/2002 |

* cited by examiner

*Primary Examiner*—Eric Culbreth
*Assistant Examiner*—Joseph Rocca
(74) *Attorney, Agent, or Firm*—Rankin, Hill, Porter & Clark LLP

(57) ABSTRACT

An airbag device for a vehicle includes an airbag that can be inflated to restrain an occupant of the vehicle against the impact of a collision, an inflator for generating gas to inflate the airbag, and a guide passage provided between the inflator and the airbag for guiding the gas into the airbag. The airbag has at least one opening formed therein to provide a fluid communication between the interior and exterior of the airbag, the opening being disposed near the guide passage to perform an aspiratory function efficiently.

26 Claims, 31 Drawing Sheets

AIRBAG DEVICE FOR VEHICLES

FIELD OF THE INVENTION

The present invention relates to an airbag module or device for vehicles including an airbag which is automatically inflated with gas to provide restraint cushioning to the vehicle's occupant against the impact of a collision.

BACKGROUND OF THE INVENTION

Airbag devices are generally known and used as a passive restraint device consisting of bags which are inflated with gas to restrain the driver and passengers during a collision. Some known airbag devices have an aspiratory function to accelerate deployment of the airbag by drawing the surrounding air into the airbag by suction created when the gas discharged from an inflator flows into the airbag. Typical examples of such airbag devices are disclosed in Japanese Patent No. 3275771 (corresponding to JP-10297411-A) and Japanese Patent Laid-Open Publication (JP-A) No. 9076866.

The airbag device disclosed in JP-10297411-A is a side airbag device and, as shown here in FIG. 39, the side airbag device 300 includes an airbag 301 having an upper part 302 provided for protection of the chest of a vehicle occupant, a lower part 303 provided for protection of the abdominal part of the occupant, and an attachment part 304 formed integrally with a rear portion of the lower part 303 for attachment of the airbag 301 to the frame of a seat back (not shown). The attachment part 304 accommodates within it an inflator 306. The inflator 306 is disposed vertically and has a nozzle at a lower end hereof. The airbag 301 has an opening 305 formed in an upper end portion of the attachment part 304 for adjusting internal pressure of the airbag 301. The opening 305 is disposed upstream of or on an opposite side of the nozzle of the inflator 306.

With this arrangement, when the inflator 306 is activated or fired to inflate the airbag 301, the surrounding air is drawn from the opening 305 into the airbag 301 by suction created when gas discharged from the inflator 306 flows into the airbag 301. By thus taking the surrounding air into the airbag 301, the side airbag device 300 performs an aspiratory function to accelerate the deployment of the airbag 301. However, due to the location of the nozzle of the inflator 306, the gas discharged from the inflator 306 first flows in a horizontal direction, then advancing vertically upward through the lower part 303 of the airbag 301. By thus taking a bent flow path, the gas flow cannot obtain a sufficiently high speed to create a suction which is high enough to take in a sufficient amount of surrounding air through the opening 305 into the airbag 301. Thus, only a limited aspiration effect can be attained.

FIG. 40 hereof shows an airbag device 310 disclosed in JP-9076866-A. The airbag device 310 includes a module case 311 disposed in a dashboard or instrument panel of the vehicle, an inflator 312 received in the module case 311 for inflating an airbag 314 connected to an open end 313 of the module case 311. The module case 311 has a plurality of openings 315 and a corresponding number of baffle plates 316 projecting obliquely into the module case 312 from respective peripheral edges of the openings 315. The openings 315 and the inclined baffle plates 316 are located between the inflator 312 and the airbag 314 so that the surrounding air can be drawn from the openings 315 into the airbag 314 due to suction created when gas discharged from the inflator 312 flows into the airbag 314.

With this arrangement, however, since the flow of gas generated from the inflator 312 is not stable due to the presence of the baffle plates 316, and since the openings 315 provide a relatively small open area, only a limited aspiration effect can be attained by the airbag device 310.

It is accordingly an object of the present invention to provide an airbag device which is capable of achieving an aspiration effect efficiently to speed up the deployment of an airbag.

SUMMARY OF THE INVENTION

According to the present invention, there is provided an airbag device for a vehicle, comprising an airbag which can be inflated to restrain an occupant of the vehicle against the impact of a collision, an inflator for generating gas to inflate the airbag, and a guide passage provided between the inflator and the airbag for guiding the gas into the airbag. The airbag has at least one opening formed therein to provide a fluid communication between the interior and exterior of the airbag, the opening being disposed near the guide passage.

With this arrangement, since the guide passage is provided between the inflator and the airbag and since the opening is formed in the airbag and disposed near the guide passage, the surrounding air is drawn with increased efficiency into the airbag via the opening due to suction created when gas flows into the airbag (aspiration effect). By virtue of this aspiration effect, the airbag can inflate rapidly and efficiently. The aspiration effect may further allow for the use of a small capacity inflator in combination with a large volumetric capacity airbag.

Preferably, the guide passage is formed as an integral part of the airbag. The thus formed guide passage can be formed from the same material as a body of the airbag and made foldable with the airbag body. The airbag device having such airbag is compact in size and can be produced easily at a relatively low cost.

The airbag device may further comprise a gas storage chamber disposed between the inflator and the guide passage for temporarily storing therein the gas discharged from the inflator. By thus providing the gas storage chamber, the gas is able to pass through the guide passage with increased stability.

The airbag may further have a flexible tubular member connected at one end to a peripheral edge of the at least one opening. The flexible tubular member is deformable to assume an aspirating position projecting into the airbag while the airbag is to be deployed. In the final stages of deployment, the gas flow introduced from the guide passage into the airbag no longer possesses a sufficient speed to create a partial vacuum, which is large enough to aspirate the surrounding air into the airbag via the opening into the airbag. The flexible tubular member is allowed to assume a recumbent position lying flat on an internal surface of the airbag and closing the opening. By thus closing the opening by the tubular member, the gas is trapped in the airbag against leakage. While the airbag is in an occupant restraint phase, the flexible tubular member assumes a vent position projecting outward from the airbag. In the vent position, the tubular member serves as a vent hole, which allows the gas to escape from the airbag. Thus, upon contact with the occupant, the airbag immediately begins to deflate via the vent hole formed by the tubular member.

The tubular member is preferably tapered and has a large end connected to the peripheral edge of the at least one opening and a small end opposite the large end.

In one preferred form of the invention, the at least one opening formed in the airbag comprises a tubular duct having an end connected to the airbag and facing an internal space of the airbag to provide a fluid communication between the interior and exterior of the airbag. With this arrangement, since the tubular duct used to define the at least one opening formed in the airbag has a rigid structure, the opening can retain its original shape and size at all times regardless of the condition of the airbag. By thus providing the opening, the airbag device is able to perform an aspiratory function stably and efficiently.

The tubular duct may be provided with a one-way valve for automatically blocking flow of fluid in one direction headed away from the airbag while allowing flow in the opposite direction headed toward the airbag. By virtue of the one-way valve, flow of the fluid in the duct is automatically limited to a single direction headed toward the airbag so that the airbag is inflated efficiently without involving the escape of the gas from the airbag.

The airbag device may further comprises a case in which instance the inflator is received in the case and the guide passage extends from the case and is formed as an integral part of the case. With this arrangement, since the guide passage is formed as an integral part of the case instead of the airbag, it is readily possible to replace the airbag with a new airbag of different size and configuration. The airbag is free from the guide passage and hence has a relatively simple structure and can be manufactured easily at a relatively low cost.

The guide passage has an inlet opening facing the inflator and an outlet opening facing an internal space of the airbag. Preferably, the outlet opening is smaller in size than the inlet opening. The guide passage may be tapered in which instance the inlet opening is formed in a large end of the tapered guide passage, and the outlet opening is formed in a small end of the tapered guide passage. As an alternative, the guide passage may be flared at an end thereof and the inlet opening is formed in the flared end of the guide passage. By thus configuring the guide passage, the gas gains a speed as it passes through the guide passage. Thanks to the speed gain, the surrounding air is drawn from the at least one opening into the airbag by suction created when the gas flows into the airbag.

In one preferred form of the invention, the airbag has a protrusion protruding forward from an occupant restraint surface which restrains the occupant when the airbag is deployed. The protrusion is located at a position substantially corresponding to the position of a head of the occupant. By thus providing the protrusion, it is possible to restrain the occupant's head at early stages of collision. Furthermore, since the protrusion offers a smaller restraint force than other parts of the occupant restraint surface, the occupant's head is restrained more softly than other parts of the occupant body. Preferably, the airbag is formed from a woven fabric, and the protrusion is formed on the woven fabric as an integral part thereof. Alternatively, the protrusion may be a folded part of the woven fabric. The airbag having such protrusion is simple in structure and can be manufactured easily at a relatively low cost.

Preferably, the guide passage has a flow control portion for rectifying flow of the gas generated by the inflator and directing the gas toward the airbag, and a branch passage is provided downstream of, and branched off from, the flow control portion for allowing the gas to escape from the airbag. With this arrangement, under normal deployment conditions, the gas, which has been rectified and directed toward the airbag by means of the flow control portion, smoothly flows into the airbag without entering the branch passage so that the airbag inflates quickly and efficiently. Alternatively, if inflation of the airbag involves undesired interruption caused by an obstacle such as a large-sized package, the gas is released from the airbag through the branch passage due to a pressure rise created within the airbag. By thus venting the airbag, further inflation of the second bag can be avoided.

Preferably, the guide passage is formed by a first bag into which the gas is directly supplied from the inflator, and the flow control portion is formed on an end of the first bag opposite the inflator, The airbag comprises a second bag into which the gas is supplied through the flow control portion of the first bag. The branch passage is provided between the first bag and the second bag and includes an on-off valve operable to discharge the gas from the airbag through the branch passage.

With this arrangement, since the branch passage for releasing the gas from the second bag is provided between the first bag into which the gas is directly supplied from the inflator, and the second bag into which the gas is supplied via the first bag, and since the branch passage is provided with an on-off valve, the on-off valve is kept in an "off" or closed state unless the needs arises so that deployment of the second bag can be performed with increased efficiencies. When the needs arises due, for example, to undesired interruption of inflation of the second bag by an obstacle such as a package, the on-off valve is opened to thereby vent the gas rapidly from the second bag via the branch passage. While the on-off valve is in the "on" or open state to perform venting operation, the first bag is kept in a fully inflated condition because the on-off valve is provided between the first bag and the second bag. Furthermore, since the on-off valve is formed by using a joint between the first bag and the second bag, provision of such on-off valve does no incur additional cost.

Preferably, the branch passage and the on-off valve are formed by and between a first communicating hole part projecting from the first bag into the second bag and forming the flow control portion and a second communicating hole part projecting from the second bag into an internal space of the second bag, the first communicating hole part and the second communicating hole part being overlapped with each other so that a gap can be formed between the first and second communicating hole parts.

With this arrangement, if inflation of the second bag proceeds without undesired interruption, the first communicating hole part projecting from the first bag into the second bag and the second communicating hole part projecting from the second bag into the second bag are both able to deploy in an appropriate manner. The first communicating hole part and the second communicating hole part are subjected to internal pressure of the first bag and internal pressure of the second bag, respectively, which act in opposite directions to bring together the first communicating hole part and the second communicating hole part. Thus, the on-off valve formed by the first and second communicating hole parts is kept closed. Alternatively, if inflation of the second bag involves undesired interruption caused by an obstacle such as a package, deployment resistance increases rapidly. This will cause the on-off valve to open, allowing the gas to enter and then spread the branch passage defined between the first communicating hole part of the first bag and the second communicating hole part of the second bag. Thus the gas in the second bag is allowed to escape rapidly.

The first communicating hole part and the second communicating hole part may be connected together by adhesive bonding at their respective portions spaced at intervals in a circumferential direction of the first and second communicating hole parts. Alternatively, the first communicating hole part and the second communicating hole part may be connected together by sewing stitches extending over the entire circumferences of the first and second communicating hole parts. As a further alternative, the first bag and the second bag are connected together by straps extending therebetween and arranged at regular intervals around the first and second communicating hole parts while the first and second communicating hole parts are kept in an overlapped condition.

In one preferred form of the invention, the number of the on-off valve is plural, and the first bag and the second bag are joined together at portions located between the adjacent on-off valves. With this arrangement, the first and second bags do not require any joint formed at the first and second communicating hole parts and, hence, the first and second communicating hole parts are relatively freely deformable. Accordingly, if deployment resistance increases due to undesired interruption of the inflation of the second bag, the first communicating hole parts will slip out of the second communicating hole parts in a radial outward direction of the second bag, allowing the gas to escape from the second bag.

Preferably, the second bag has at least one opening formed therein at a portion located adjacent to the on-off valve. With this arrangement, due to a partial vacuum or suction created when the gas flows from the first bag into the second bag, the surrounding air is drawn from the opening into the second bag (aspiration effect), accelerating inflation of the second bag.

The guide passage preferably has a tubular shape. The guide passage of tubular shape makes it possible to arrange the flow control portion close to the inflator to thereby shorten the distance between the inflator and the branch passage disposed downstream of the flow control portion. By thus shortening the inflator-to-branch passage distance, undesired inflation of the airbag can be avoided even when an obstacle such as package is disposed close to the airbag device.

The guide passage preferably has a convergent portion disposed upstream of the branch passage. While deployment of the airbag proceeds under normal conditions, the gas, which has been rectified and directed toward the airbag by means of the flow control portion, is further guided by the convergent portion to flow in a convergent manner toward the airbag. Accordingly, it will never occur that the gas enters the branch passage. Thus, the airbag inflates rapidly and efficiently.

In one preferred form of the invention, the branch passage is formed by a branch section, the branch section being inwardly folded back about an intermediate portion thereof. When inflation of the airbag proceeds normally without involving undesired interruption, internal pressure in the guide passage forcibly deflects the inwardly folded part of the branch section in a manner to close a discharge opening formed at a distal end of the branch section. The gas is no longer possible to enter the branch passage with the result that the airbag can deploy rapidly and efficiently. If inflation of the airbag involves undesired interruption caused by an obstacle such as package, the branch tube section is unfolded or spread out due to undue pressure rise created within the airbag. Thus spread branch section now allows the gas to escape from the airbag so that further inflation of the airbag does not take place.

In one preferred form of the invention, the guide passage and the branch passage are formed by separate members disposed inside the airbag and structurally independent from the airbag. This arrangement provides a higher degree of design freedom in arranging the discharge opening of the branch passage. Alternatively, the guide passage and the branch passage may be at least partially formed by the airbag. This arrangement makes it possible to lower the bulkiness of airbag and allows for compact folding of the airbag.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
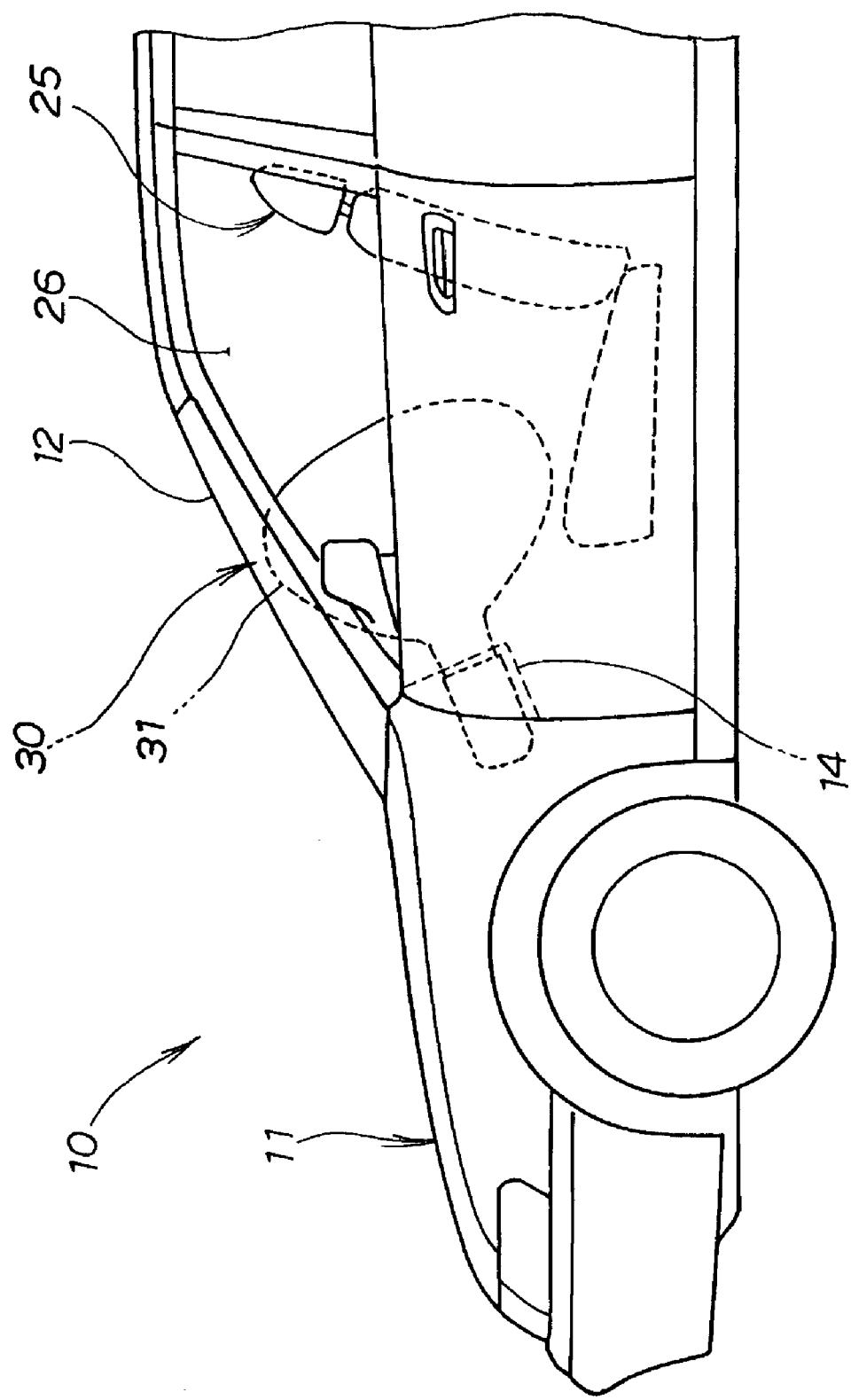
FIG. 1 is a side view of a front part of a motor vehicle in which an airbag device embodying the present invention is incorporated.

Referring now to the drawings and FIG. 1 in particular, there is shown in left side view a front part of a motor vehicle in which an airbag module or device 30 embodying the present invention is incorporated. In the illustrated first embodiment, the airbag device 30 comprises a passenger-side airbag device installed in a dashboard or instrument panel 14 above a glove box (not shown). The airbag device 30 includes an airbag 31, which is inflated with gas to restrain an occupant of a front passenger seat 25 during a collision. In FIG. 1 reference numeral 11 denotes a body of the vehicle 10; 12, a windshield of the vehicle 10; and 26, a passenger compartment of the vehicle 10.

Figure 2:
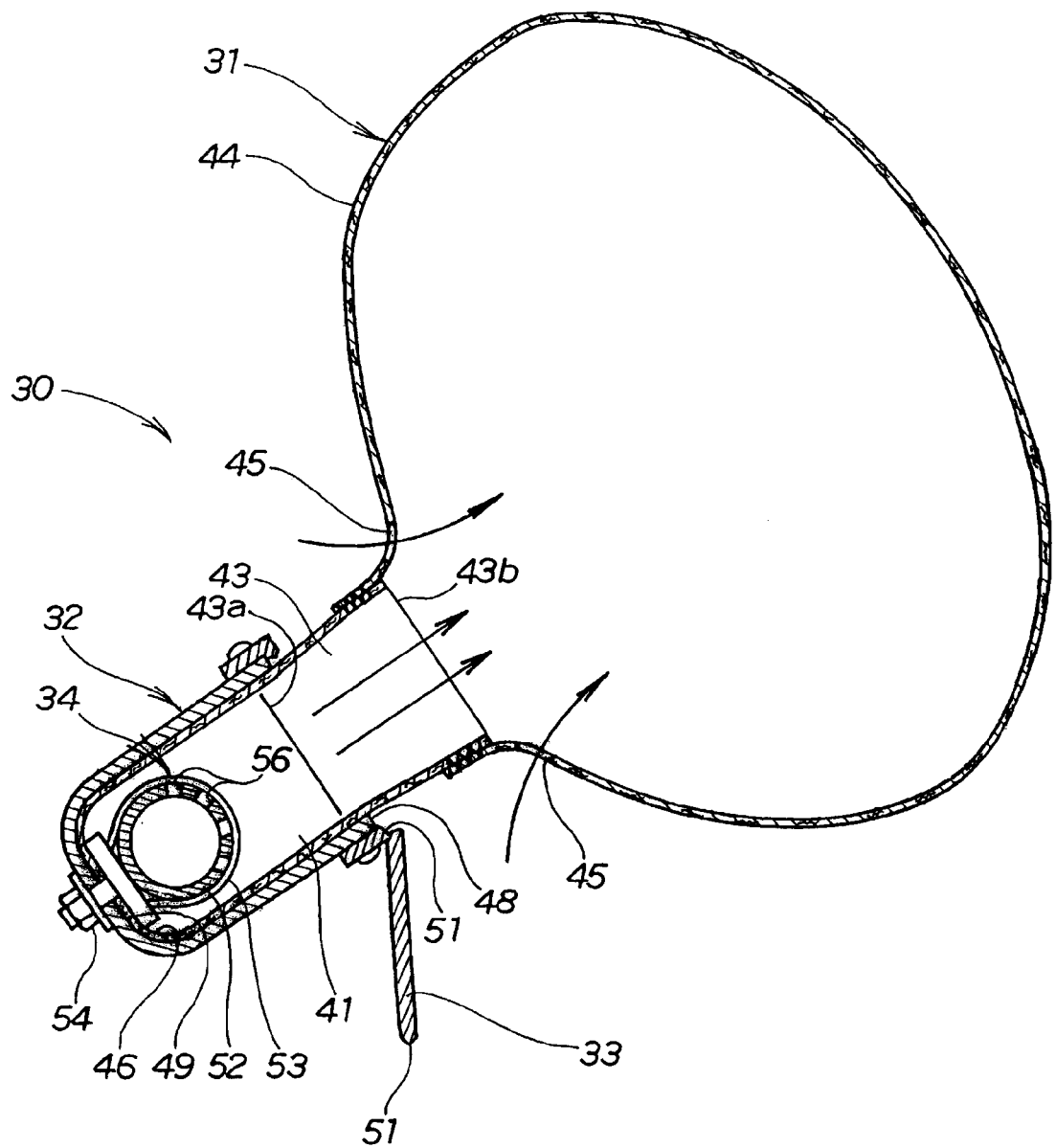
FIG. 2 is a cross-sectional view showing an airbag device according to a first embodiment of the present invention as it is in a deployed condition.

As shown in FIG. 2, the airbag device 30 further includes a case 32 in which the airbag 31 is received in a folded condition until the airbag device 30 is operated, a lid 33 mounted to normally close an opening 48 of the case 32, and an inflator 34 disposed on a bottom 49 of the case 32. When the inflator 34 is fired or activated, gas is discharged from the inflator 34 into the airbag 31 to thereby inflate the airbag 31.

The airbag 31 is made of a flexible material such as fabric and includes a hollow box-like portion 41 complementary in contour to an inside configuration of the case 32, a guide portion or passage 43 of generally tubular shape extending continuously from an open end (not designated) of the box-like portion 41, and an airbag body 44 formed integrally with a fore end of the guide passage 43. The airbag 31 further has a plurality of openings 45 formed in the airbag body 44 and located near the guide passage 43. The guide passage 43 has an inlet opening 43a integral with the open end of the box-like portion 41 and facing the inflator 34, and an outlet opening 43b facing an internal space of the airbag body 44. The guide passage 43 has a uniform diameter throughout the length thereof. The diameter of the guide passage 43 is smaller than a size of the box-like portion 41 as measured in a direction parallel to the axis of the cylindrical body 52 of the inflator 34. The openings 45 are disposed adjacent to the outlet opening 43b of the guide channel 43. The openings 45 thus formed provide fluid communication between the interior and exterior of the airbag 31.

The lid 33 has a weak portion 51 formed by reducing the thickness of the lid 33 to the extent that the lid 33 can be split or torn away at the weak portion 51 when the airbag 31 is deployed.

The inflator 34 includes a cylindrical body 52, a metal fitting 53 for supporting the cylindrical inflator body 52 on the bottom 49 of the case 32, and a nut 54 threaded with a stud bolt of the metal fitting 53 to secure the metal fitting 53 to the bottom 49 of the case 32. The inflator body 52 contains therein an electronic ignition device, ignition agent, nitrogen gas and other components (neither shown). The inflator body 52 has a plurality of nozzles 56 formed in a cylindrical wall thereof for discharging gas, such as nitrogen gas, into the airbag 31.

The airbag device 30 of the foregoing construction operates in a manner shown in FIGS. 3A to 3D. In the initial condition shown in FIG. 3A, the airbag 31 is received in a folded condition within an internal space of the case 32 and the lid 33 is closed to cover the components 31, 34 stored in the case 32.

When crash sensors (not shown) supplies electric signals to a control unit (not shown) and the control unit determines that the airbag 31 is to be deployed, the inflator 34 is fired or activated whereupon nitrogen gas is discharged from the nozzles 56 (FIG. 2) of the inflator 34 into the airbag 31. The discharged gas flows downstream through the box-like portion 41 and the guide passage 43 in succession and enters the airbag body 44. In early stages of deployment, the airbag 31 splits the lid 33 at the weak portion 51 and begins to inflate rapidly to assume a linear cylindrical configuration projecting in a direction as indicated by the profiled arrow "a1" shown in FIG. 3B.

Figure 3A:
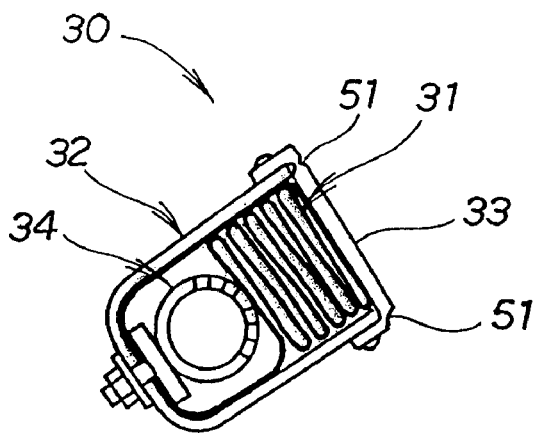
FIGS. 3A to 3D are diagrammatical views illustrative of operation of the airbag device of FIG. 2.
Figure 3B:
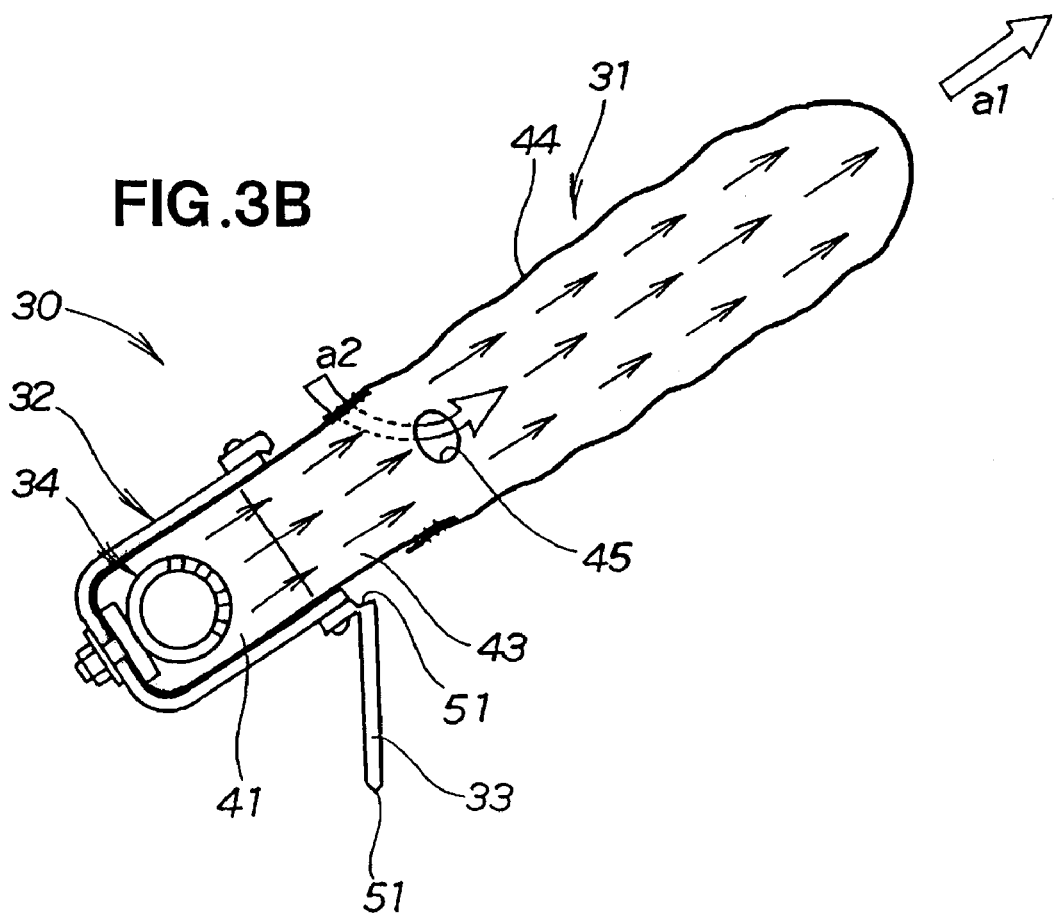

In this instance, since the guide passage 43 is provided between the inflator 34 and the airbag body 44, and since the openings 45 (only one being shown in FIG. 3B) are formed in the airbag body 44 and located near the guide passage 43, the surrounding air is drawn from the openings 45 into the airbag body 44, as indicated by the profiled arrow "a2" shown in FIG. 3B, due to suction created when the gas flows into the airbag body 44. By an aspiration effect thus achieved, it is possible to speed up the deployment of the airbag 31.

As previously described, the aspiration effect varies in efficiency with the speed of flow of the gas achieved when the gas enters the airbag 31. According to the illustrated embodiment, the direction of flow of the discharge gas is regulated or kept constant by the guide passage 43. By thus controlling the flow direction of the discharged gas, the gas is introduced into the airbag body 44 smoothly and rapidly without involving speed degradation. This ensures that due to a partial vacuum created in the airbag 31, the surrounding air is drawn into the airbag body 44 through the openings 45, which will accelerate the deployment of the airbag 31. By virtue of an aspiration effect thus attained with high efficiencies, it is possible to use a small capacity inflator in combination of a large volume airbag. Furthermore, since the tubular guide passage 43 has a diameter smaller than a size of the box-like portion 41 as measured in the axial direction of the cylindrical inflator body 52 (FIG. 2), the gas gains a speed as it passes through the guide passage 43. This leads to an aspiration function performed with increased efficiency.

Figure 3C:
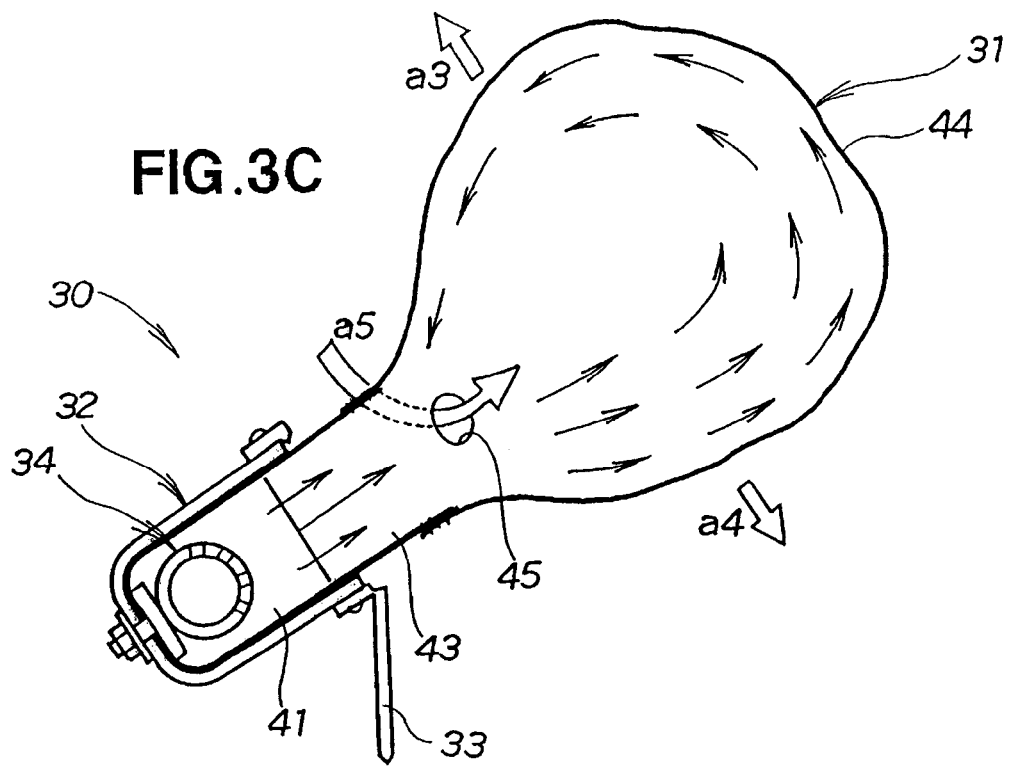

The airbag 31, which has inflated into the linear cylindrical configuration of FIG. 3B, then begins to inflate in a radial direction perpendicular a longitudinal axis of the linear cylindrical configuration, as indicated by the profiled arrows "a3" and "a4" shown in FIG. 3C. The surrounding air is continuously drawn into the airbag body 44 via the openings 45, as indicated by the profiled arrow "a5" shown in FIG. 3C. This will continue until the speed of the gas flow falls below a level as required to create a partial vacuum in the airbag 31.

Figure 3D:
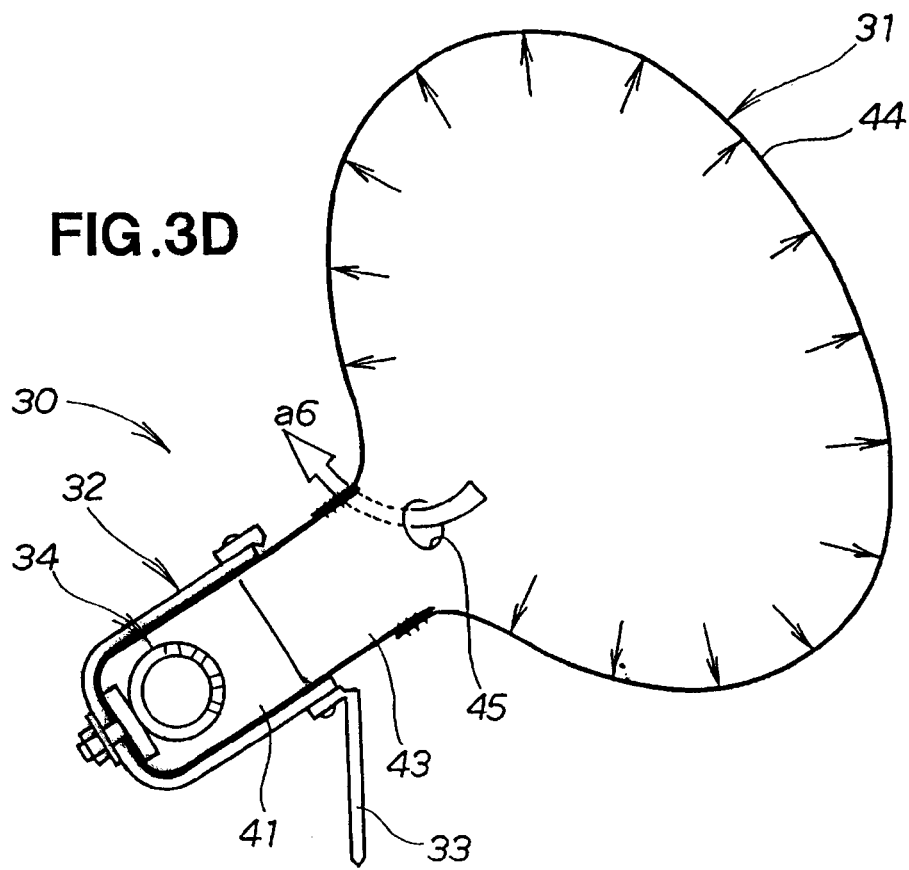

The airbag 31 including the box-like portion 41, guide passage 43 and airbag body 44 is fully inflated as shown in FIG. 3D, and after that the gas is allowed to escape from the airbag 31 via the openings 45 as indicated by the profiled arrow "a6" shown in FIG. 3D. In this instance, the openings 45 serve as vent holes, which control the internal pressure of the airbag 31 in an appropriate manner.

In the first embodiment shown in FIG. 2, since the guide passage 43 is formed as an integral part of the airbag 31, it is possible to produce the guide channel 43 using the same material as the airbag body 44. The thus formed guide passage 43 can be folded with the airbag body 44. The airbag device 30 having such airbag 31 is relatively compact in size and can be manufactured easily at a relatively low cost.

Figure 4:
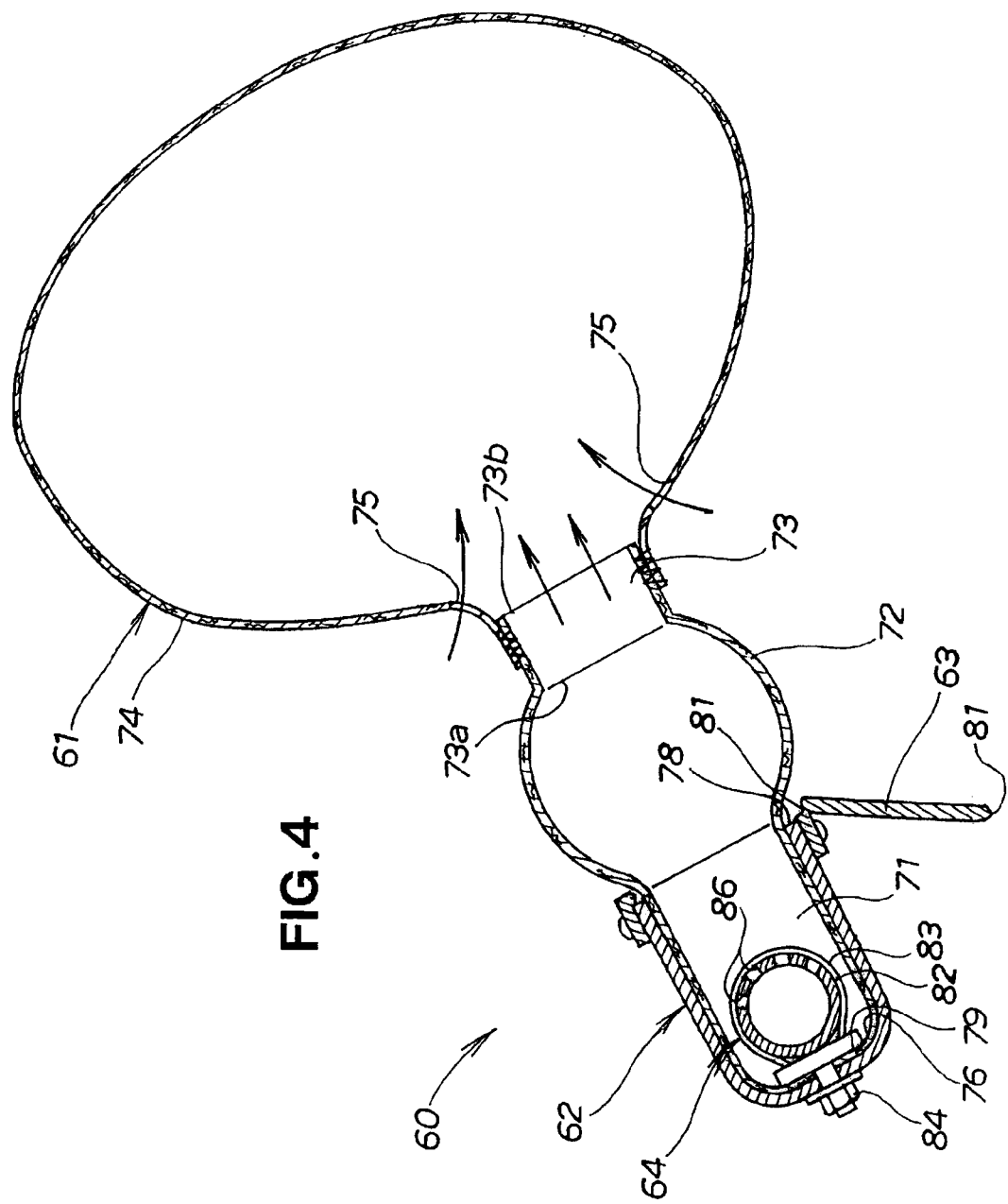
FIG. 4 is cross-sectional view showing an airbag device according to a second embodiment of the present invention as it is in a deployed condition.

FIG. 4 shows in cross section an airbag device 60 according to a second embodiment of the present invention. The airbag device 60 includes an airbag 61 inflatable to assume a deployed position shown in FIG. 4, a case 62 in which the airbag 61 is received in a folded condition until the airbag device 60 is operated, a lid 63 mounted to normally close an opening 78 of the case 62, and an inflator 64 disposed on a bottom 79 of the case 62. When the inflator 64 is fired or activated, gas is discharged from the inflator 74 into the airbag 61 to thereby inflate the airbag 61.

The airbag 61 includes a hollow box-like portion 71 complementary in contour to an inside configuration of the case 62, a gas storage chamber 72 formed integrally with the box-like portion 71 for temporarily storing the gas discharged from the inflator 64, a guide portion or passage 73 of generally tubular shape extending continuously from an end of the gas storage chamber 72 opposite the box-like portion 71, and an airbag body 74 formed integrally with a fore end of the guide passage 73. The airbag 61 further has a plurality of openings 75 formed in the airbag body 74 and located near the guide passage 73. The guide passage 73 has an inlet opening 73a integral with an outlet opening of the gas storage chamber 72 and an outlet opening 73b facing an internal space of the airbag body 74. The guide passage 73 has a uniform diameter throughout the length thereof. The gas storage chamber 72 is bulged to assume a generally barrel-like configuration and has a larger diameter than the tubular guide passage 73. The gas storage chamber 72 has a volume much larger than a volume of the guide passage 73. The openings 75 are disposed adjacent to the outlet opening 73b of the guide channel 73. The openings 75 thus formed provide fluid communication between the interior and exterior of the airbag 61.

The lid 63 has a weak portion 81 formed by reducing the thickness of the lid 63 to the extent that the lid 63 can be split or torn away at the weak portion 81 when the airbag 61 is deployed. The lid 63 is structurally the same as the lid 33 in the first embodiment shown in FIG. 2.

The inflator 64 also has the same structure as the inflator 34 shown in FIG. 2 and includes a cylindrical body 82, a metal fitting 83 for supporting the cylindrical inflator body 82 on the bottom 79 of the case 62, and a nut 84 threaded with a stud bolt of the metal fitting 83 to secure the metal fitting 83 to the bottom 79 of the case 62. The inflator body 82 contains therein an electronic ignition device, ignition agent, nitrogen gas and other components (neither shown). The inflator body 82 has a plurality of nozzles 86 formed in a cylindrical wall thereof for discharging gas, such as nitrogen gas, into the airbag 61.

In the second embodiment shown in FIG. 4, the gas storage chamber 72 is disposed between the inflator 64 and the guide passage 73 for temporarily storing the gas discharged from the inflator 64. By thus providing the gas storage chamber 72, the gas is allowed to pass through the guide passage 73 with increased stability.

Figure 5:
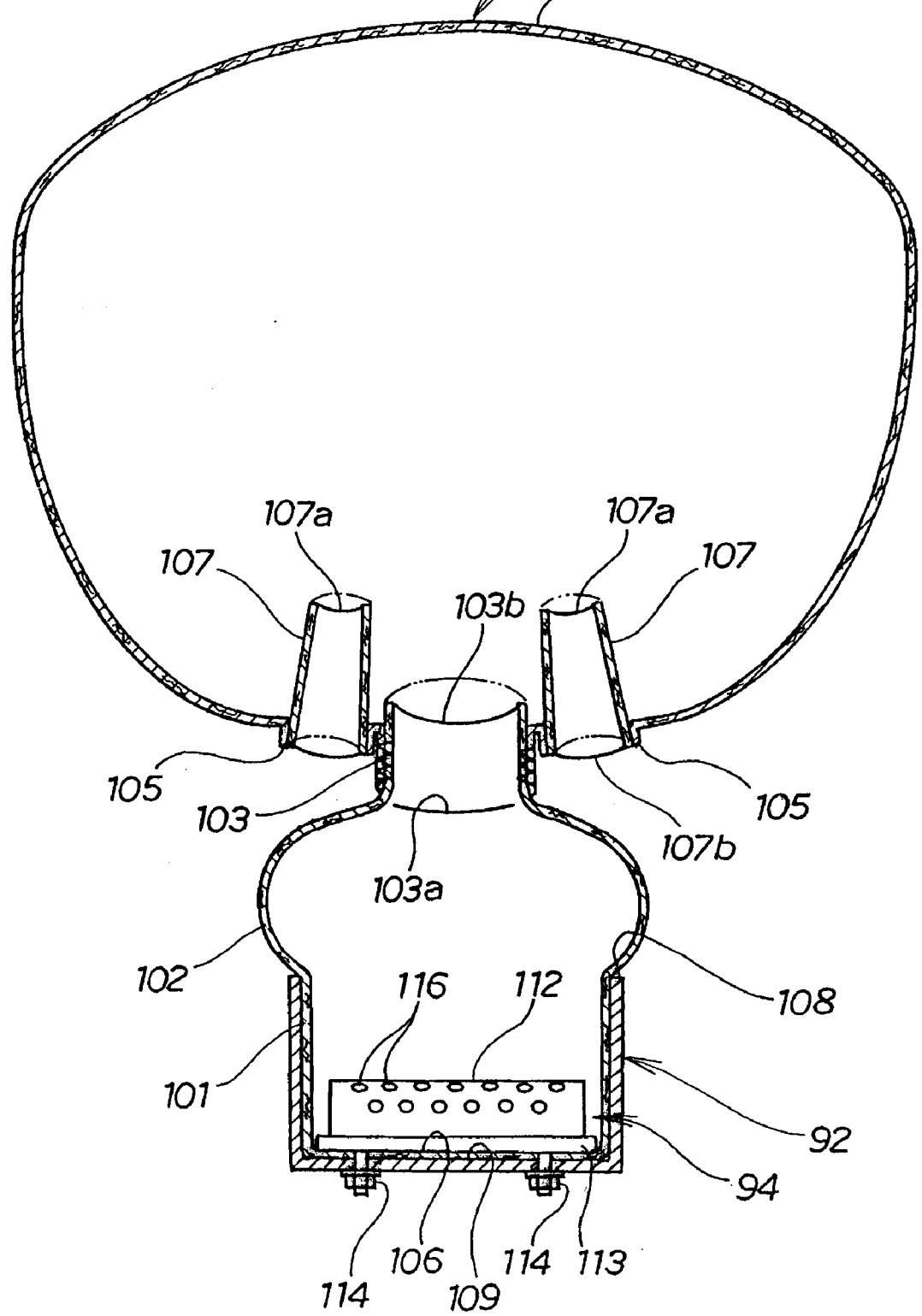
FIG. 5 is a cross-sectional view showing an airbag device according to a third embodiment of the present invention as it is in a deployed condition.

FIG. 5 shows in cross section an airbag device 90 according to a third embodiment of the present invention. The airbag device 90 includes an airbag 91 inflatable to assume a deployed position shown in FIG. 5, a case 92 in which the airbag 91 is received in a folded condition until the airbag device 90 is operated, a lid (not shown but identical to the one 63 shown in FIG. 4) mounted to normally close an opening 108 of the case 92, and an inflator 94 disposed on a bottom 109 of the case 92. When the inflator 94 is fired or activated, gas is discharged from the inflator 94 into the airbag 91 to thereby inflate the airbag 91.

The airbag 91 includes a hollow box-like portion 101 complementary in contour to an inside configuration of the case 92, a gas storage chamber 102 formed integrally with the box-like portion 71 for temporarily storing the gas discharged from the inflator 94, a guide portion or passage 103 of generally tubular shape extending continuously from an end of the gas storage chamber 102 opposite the box-like portion 101, and an airbag body 104 formed integrally with a fore end of the guide passage 103. The airbag 91 further has a plurality of openings 105 formed in the airbag body 104 and located near the guide passage 103. The guide passage 103 has an inlet opening 103a integral with an outlet opening of the gas storage chamber 102 and an outlet opening 103b facing an internal space of the airbag body 104. The guide passage 103 has a uniform diameter throughout the length thereof. The gas storage chamber 102 is bulged to assume a generally barrel-like configuration and has a larger diameter than the tubular guide passage 103. The gas storage chamber 102 has a volume much larger than a volume of the guide passage 103. The openings 105 are disposed adjacent to the outlet opening 103b of the guide channel 103. The openings 105 thus formed provide fluid communication between the interior and exterior of the airbag 91.

Though not shown, the lid has a weak portion so that the lid can be split or torn away at the weak portion when the airbag 91 is deployed. The inflator 94 has the same structure as the inflator 64 shown in FIG. 4 and includes a cylindrical body 112, a metal fitting 113 for supporting the cylindrical inflator body 112 on the bottom 109 of the case 92, and nuts 114 threaded with mating stud bolts of the metal fitting 113 to secure the metal fitting 113 to the bottom 109 of the case 92. The inflator body 112 contains therein an electronic ignition device, ignition agent, nitrogen gas and other components (neither shown). The inflator body 112 has a plurality of nozzles 116 formed in a cylindrical wall thereof for discharging gas, such as nitrogen gas, into the airbag 91.

The airbag 91 shown in FIG. 5 further includes flexible tubular members 107 connected at one end to peripheral edges of the respective openings 105. The tubular members 107 are tapered and have large ends connected to the peripheral edges of the respective openings 105 and small ends 107a opposite to the large ends. The flexible tubular members 107 are deformable to project into the airbag body 104 when the airbag 91 is deployed.

Figure 6:
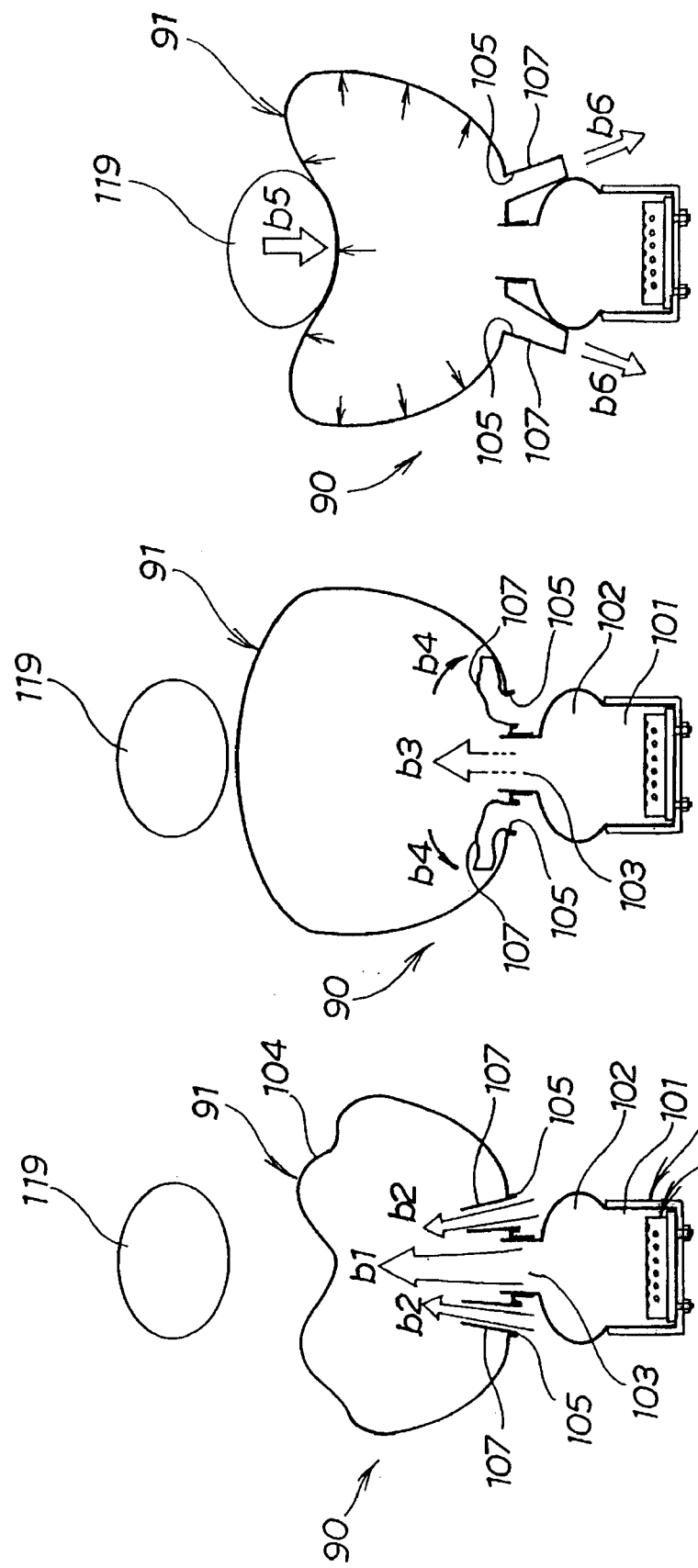
FIGS. 6A to 6C are diagrammatical views illustrative of operation of the airbag device of FIG. 5.

The airbag device 90 of the foregoing construction operates in a manner as shown in FIGS. 6A to 6C. FIG. 6A shows the airbag device 90 as it is in an early stage of deployment. In this deployment stage, gas generated by the inflator 94 is rectified and directed toward the airbag body 104 as it advances along the guide passage 103 so that the gas can flow at high speeds into the airbag body 104, as indicated by a profiled arrow "b1" shown in FIG. 6A. Due to suction created when the gas flows into the airbag body 104, the surrounding air is drawn from the openings 105 into the airbag boy 101 as indicated by the profiled arrows "b2" shown in FIG. 6A. In this instance, since the tapered tubular members 107 are connected at one end (large ends) to the peripheral edges of the respective openings 105, the surrounding air, as it is drawn from the openings 105 into the airbag body 104, passes through the tubular members 107, causing the tubular members 107 to undergo deformation to assume an aspirating position projecting into an internal space of the airbag body 104.

As the deployment of the airbag 91 enters the final stages as shown in FIG. 6B, the air bag 91 is almost fully inflated and the gas flow introduced from the guide passage 103 into the airbag body 104, as indicated by the profiled arrow "b3", no longer processes a sufficient speed to create a partial vacuum which is large enough to aspirate the surrounding air into the airbag body 104 through the openings 105. Thus, the flexible tubular members 107 are allowed to assume a recumbent position lying flat on an internal surface of the airbag body 104, as indicated by the arrows "b4" shown in FIG. 6B. In this recumbent position, the tubular members 107 close the associated openings 105 so that the gas is trapped in the airbag 91 against leakage.

Shortly thereafter, the occupant 119 while moving forward by inertial force contacts the airbag 91, as indicated by the profiled arrow "b5" shown in FIG. 6C. This creates a pressure rise inside the airbag 91, which causes the flexible tubular members 107 to undergo deformation to assume a vent position projecting outward from the airbag 91. In this vent position, the tubular members 107 serve as vent holes and allow the gas to escape from the airbag 91, as indicated by the profiled arrows "b6". Thus, upon contact with the occupant 119, the airbag 91 immediately begins to deflate via the vent holes (tubular members) 107. The occupant 119 continues to sink deeply into the airbag 91, which cushions the head and chest of the occupant 119 while it is deflating.

It will be appreciated that the flexible tubular members 107 is deformable to assume three different positions depending on the phase of operation of the airbag 91. When the airbag 91 is to be deployed, the flexible tubular members 107 assume an aspiration position projecting into the airbag 91, so that the surrounding air can be drawn through the tubular members 107 into the airbag 91. The tubular members 107, as they are in the aspirating position, function as aspiration ducts, which are effective to increase the efficiency of the aspiratory function. In the final states of deployment, the gas flow introduced from the guide passage 103 into the airbag 91 no longer processes a sufficient speed to create a partial vacuum, which is large enough to aspirate the surrounding air into the airbag 91. The flexible tubular members 107 are allowed to assume a recumbent position lying flat on an internal surface of the airbag 91 and thus closing the openings 105. By thus closing the openings 105 by the tubular members 107, the gas is trapped in the airbag 91 against leakage. While the airbag 91 is in an occupant restraint phase, the flexible tubular members 107 assume a vent position projecting outward from the airbag 91. In the vent position, the tubular members serve as vent holes, which allow the gas to escape from the airbag 91. Thus, upon contact with the occupant, the airbag 91 immediately begins to deflate via the vent holes 107 while keeping the internal pressure of the airbag 91 at a level, which is suitable for restraint protection of the occupant against the impact of a collision.

Figure 7:
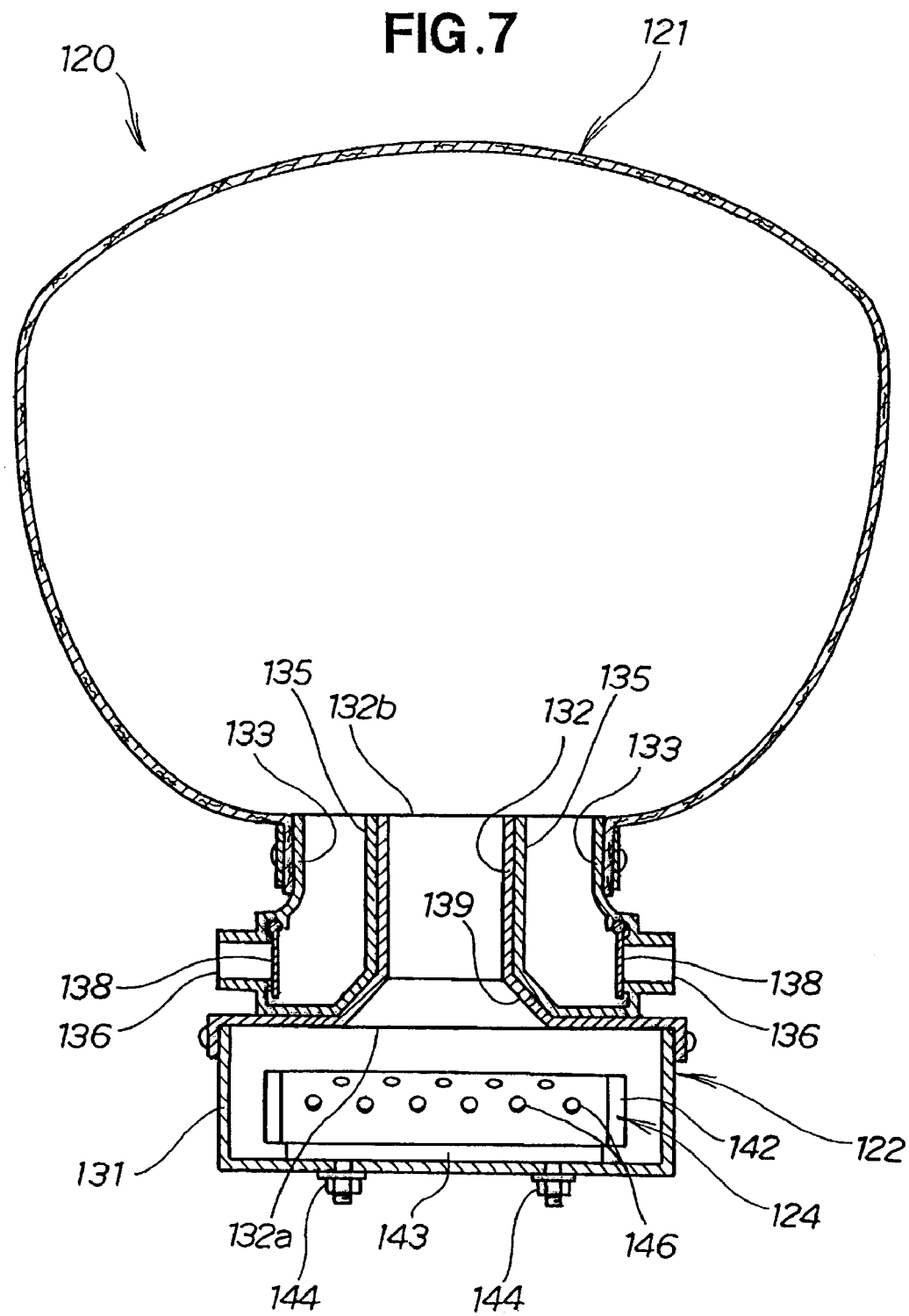
FIG. 7 is a cross-sectional view showing an airbag device according to a fourth embodiment of the present invention as it is in a deployed condition.

FIG. 7 shows in cross section an airbag device 120 according to a fourth embodiment of the present invention. The airbag device 120 includes an airbag 121 inflatable to assume a deployed position shown in FIG. 7, a case 122 having an attachment portion to which an open end of the airbag 121 is anchored, and an inflator 124 disposed inside the case 122.

The case 122 includes a case body 131 of semicircular cylindrical shape so configured as to accommodate within it the inflator 124, a guide portion or passage 132 provided between the inflator 124 and the airbag 121 for guiding gas discharged from the inflator 124 into the airbag 121, and a pair of tubular ducts 133, 133 disposed on opposite sides of the guide passage 134.

The guide passage 123 has an inlet opening 132a connected to an internal space of the case body 131 and facing the inflator 124, and an outlet opening 132b facing an internal space of airbag 121. One end portion of the guide passage 132 including the outlet opening 132b is directly connected to the opening end of the airbag 121. An opposite end portion of the guide passage 132 including the inlet opening 132a is flared as at 139 so that the outlet opening 132b is smaller in size than the inlet opening 132a. By thus providing the flared portion 139 at an inlet end thereof, the guide passage 132 is able to increase the speed of the gas as the gas passes through the guide passage 132.

Each of the tubular ducts 133 has one end 135 (upper end in FIG. 7) opening to the internal space of the airbag 121 and an opposite end 136 (lower end in FIG. 7) opening to the outside air. The upper end 135 of the tubular duct 133 is directly connected to the open end of the airbag 121 so that each duct 133 forms an opening defined in the airbag 121 and providing a fluid communication between the interior and exterior of the airbag 121. The duct 133 is provided with a one-way valve 138 for preventing flow of the fluid in a direction headed away from the airbag 121 while allowing flow in the opposite direction headed toward the airbag 121. In the illustrated embodiment, the one-way valve 138 is disposed adjacent to the inlet opening formed in the lower end 136 of the tubular duct 133.

The inflator 124 includes a cylindrical body 142, a metal fitting (support bracket) 143 for supporting thereon the cylindrical inflator body 142, and 144 threaded with mating stud bolts of the support bracket 143 to secure the support bracket 144 to the bottom of the case 122. The inflator body 142 contains therein an electronic ignition device, ignition agent, nitrogen gas and other components (neither shown). The inflator body 142 has a plurality of nozzles 146 formed in a cylindrical wall thereof for discharging gas, such as nitrogen gas, into the airbag 121.

Figure 8:
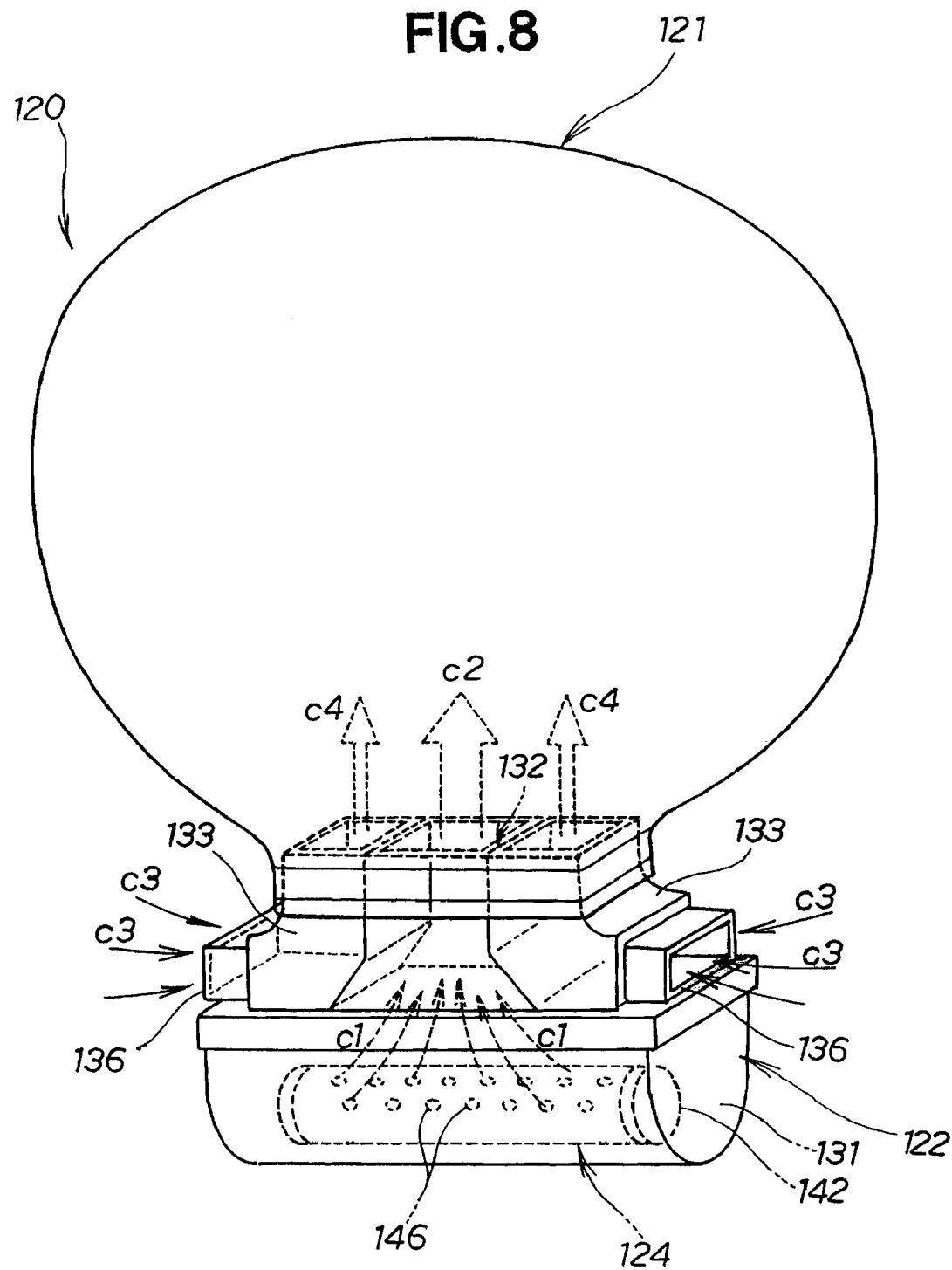
FIG. 8 is a perspective view showing operation of the airbag device of FIG. 7.

Referring next to FIG. 8, operation of the airbag device 120 will be described. In case of a crash, the inflator 124 is fired or activated whereupon gas is discharged from the nozzles 146 of the inflator body 142. The discharged gas flows into the guide passage 132, as indicated by the arrows "c1" shown in FIG. 8, then advances downstream along the guide passage 132 and finally is introduced into the airbag 12 as indicated by the profiled arrow "c2". In this instance, since the guide passage 132 is flared at an end including the inlet opening 132a (FIG. 7) and since the outlet opening 132b (FIG. 7) of the guide passage 132 is smaller in size than the inlet opening 132a, the gas gains a speed as it passes through the guide passage 132. Thanks to the speed gain, the surrounding air is drawn through the tubular ducts 133, 133 into the airbag 121, as indicated by the arrows "c3" and "c4" shown in FIG. 8, by suction created when the gas flows into the airbag 121.

In the illustrated embodiment, since the tubular ducts 133, 133 of rigid structure are used to define openings formed in the airbag 121 to provide a fluid communication between the interior and exterior of the airbag 121, the openings 133, 133 can retain their original shape and size at all times regardless of the condition of the airbag 121. By thus providing the openings 133, 133, the airbag device 120 is able to perform an aspiratory function stably and efficiently. Additionally, by virtue of the one-way valve 138 provided in each duct 133 for automatically limiting flow of the fluid to a single direction headed toward the airbag 121, the airbag 121 is inflated efficiently without involving the escape of the gas from the airbag 212.

Furthermore, since the guide passage 132 is formed as an integral part of the case 122 instead of the airbag 121, it is readily possible to replace the airbag 121 with a new airbag of different size and configuration. The airbag 121 is free from the guide passage and hence is simple in structure and can be manufactured easily at a relatively low cost.

Figure 9:
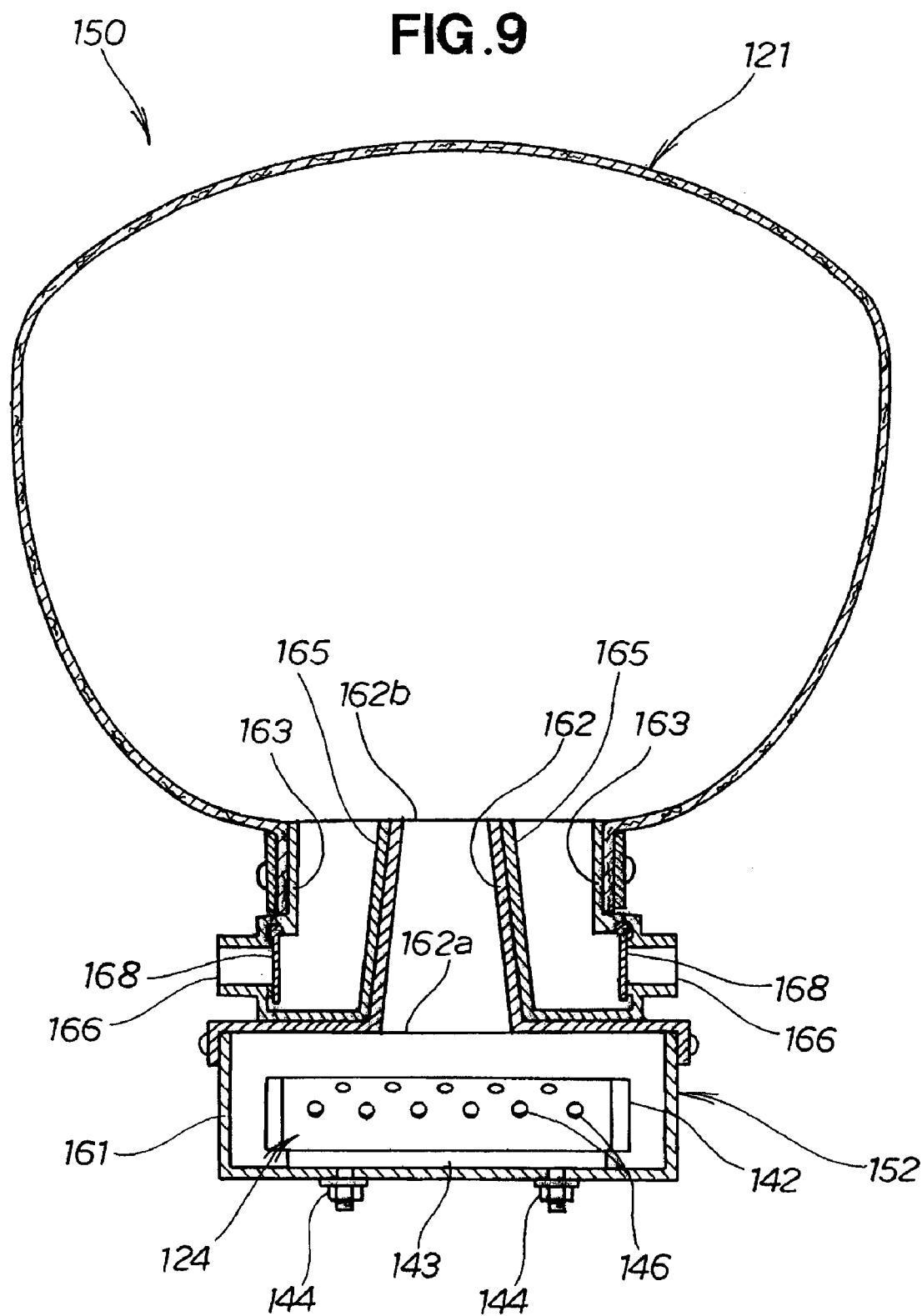
FIG. 9 is a cross-sectional view showing an airbag device according to a fifth embodiment of the present invention as it is in a deployed condition.

FIG. 9 shows in cross section an airbag device 150 according to a fifth embodiment of the present invention. In FIG. 9 the same reference characters designate these parts, which are identical to those used in the fourth embodiment shown in FIG. 7, and a further description thereof can be omitted.

The airbag device 150 includes an airbag 121 inflatable to assume a deployed position shown in FIG. 9, a case 152 having an attachment portion to which an open end of the airbag 121 is anchored, and an inflator 124 disposed in the case 152.

The case 152 includes a case body 161 of semicircular cylindrical shape so configured as to accommodate within it the inflator 124, a guide portion or passage 162 provided between the inflator 124 and the airbag 121 for guiding gas discharged from the inflator 124 into the airbag 121, and a pair of tubular ducts 163, 163 disposed on opposite sides of the guide passage 162.

The guide passage 162 is tapered and has an inlet opening 162a formed in a large end of the tapered guide passage 162 and an outlet opening 162b formed in a small end of the tapered guide passage 162. The small end including the outlet opening 162b is directly connected to the open end of the airbag 121, and the large end including the inlet opening 162a is connected to the case 152 with the inlet opening 162a facing the inflator 124. Since the guide passage is tapered in a direction from the inlet opening 162a toward the outlet opening 162b, the gas gains a speed as it passes through the tapered guide passage 162. Thanks to the speed gain, the surrounding air is drawn through the ducts 163 into the airbag by suction created when the gas flows into the airbag 121.

Each of the tubular ducts 163 has one end 165 (upper end in FIG. 9) opening to the internal space of the airbag 121 and an opposite end 166 (lower end in FIG. 9) opening to the outside air. The upper end 165 of the tubular duct 163 is directly connected to the open end of the airbag 121 so that each duct 163 defines an opening formed in the airbag 121 to provide a fluid communication between the interior and exterior of the airbag 121. The duct 163 is provided with a one-way valve 168 for preventing flow of the fluid in a direction headed away from the airbag 121 while allowing flow in the opposite direction headed toward the airbag 121. In the illustrated embodiment, the one-way valve 168 is disposed adjacent to the inlet opening formed in the lower end 166 of the tubular duct 163.

The airbag devices constructed in accordance with the invention may be installed outside the passenger compartment 26 (FIG. 1) for the purpose of providing restraint protection to a pedestrian against the shock of a collision with a motor vehicle.

Figure 10:
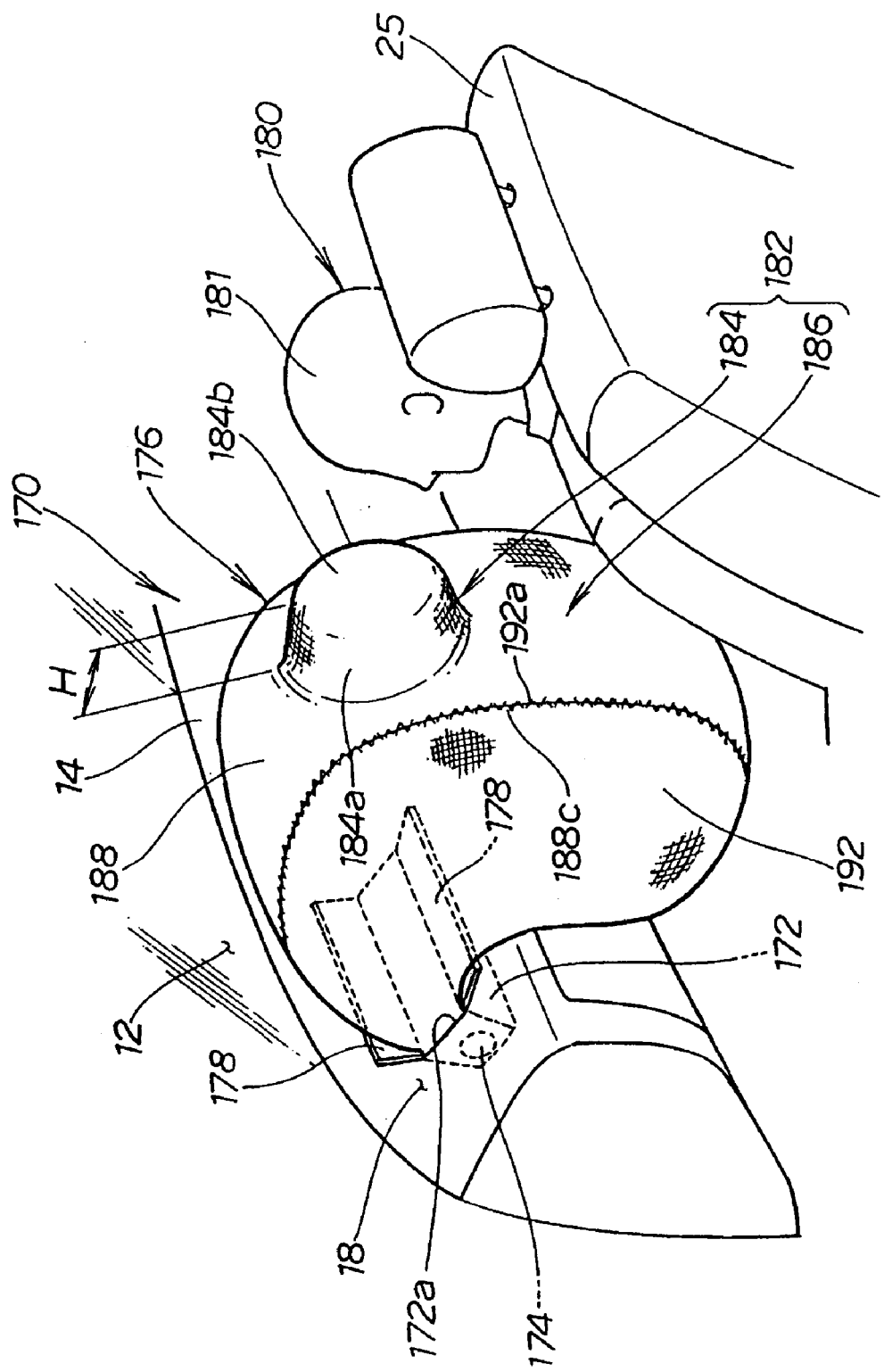
FIG. 10 is a perspective view of an airbag device according to a sixth embodiment of the present invention.

FIG. 10 shows in perspective an airbag device 170 according to a sixth embodiment of the present invention. In FIG. 10, the airbag device 170 is shown with parts in a deployed position. The airbag device 170 is a passenger-side airbag device and includes a case 172 disposed in a portion 18 of the vehicle dashboard or instrument panel 14 located above a glove box. The case 172 contains an inflator 174 and an airbag 176 (though shown in a deployed condition in FIG. 10) with its open end 172a closed by a lid 178 (though shown in a split state in FIG. 10).

In a car crash, crash sensors (not shown) supply electrical signals to a control unit (not shown) which activates or fires the inflator 174. Upon activation of the inflator 174, high-pressure gas is released from the inflator 174, which inflates the airbag 176 rapidly. The airbag 176 splits open the lid 178 and deploys from the open end 172a of the case 172 toward a passenger or occupant 180 sitting on a front passenger seat 25. The airbag 176 is fully inflated while the occupant 180 is still moving forward so that the occupant 180 can be protected against the impact of a collision by being restrained by the airbag 176. The degree of protection of the occupant 180 relies on a restraint force exerted on the occupant 180 by the airbag 176. The restraint force increases with the amount of thrust applied from the occupant 180 to the airbag 176. In view of this, the airbag device 170 has a vent mechanism (not shown) for releasing the high-pressure gas from the airbag 176 to thereby maintain a desired restraint force during collision.

The airbag 176, as it is in a fully deployed condition, has an occupant restraint surface 182 disposed in front of the passenger 180 for restraint protection of the passenger 180 against the impact of a collision. The occupant restraint surface 182 has a head-protection protrusion 184 protruding forward for protection of a head 181 of the occupant 180. To this end, the head-protection protrusion 184 is located at a position substantially corresponding to the position of the head 181 of the occupant 180 setting on the front passenger seat 25. More specifically, the occupant restraint surface 182 includes a convexly curved restraint surface portion 186 and the head-protection protrusion 184 protruding forward from the convexly curved restraint surface portion 186.

The head-protection protrusion 184 is shaped into a circular dome-like configuration having a circular peripheral wall 184*a* and a semispherical top wall 184*b*. The protrusion 184 has a height H, which is a distance between the convexly curved restraint surface portion 186 and a vertex of the semispherical top wall 184*b* of the protrusion 184. The head-protection protrusion 184 is located only at a position substantially corresponding to the position of the occupant's head 181, the shape and configuration of the airbag 176 as a whole are relatively simple.

Figure 11:
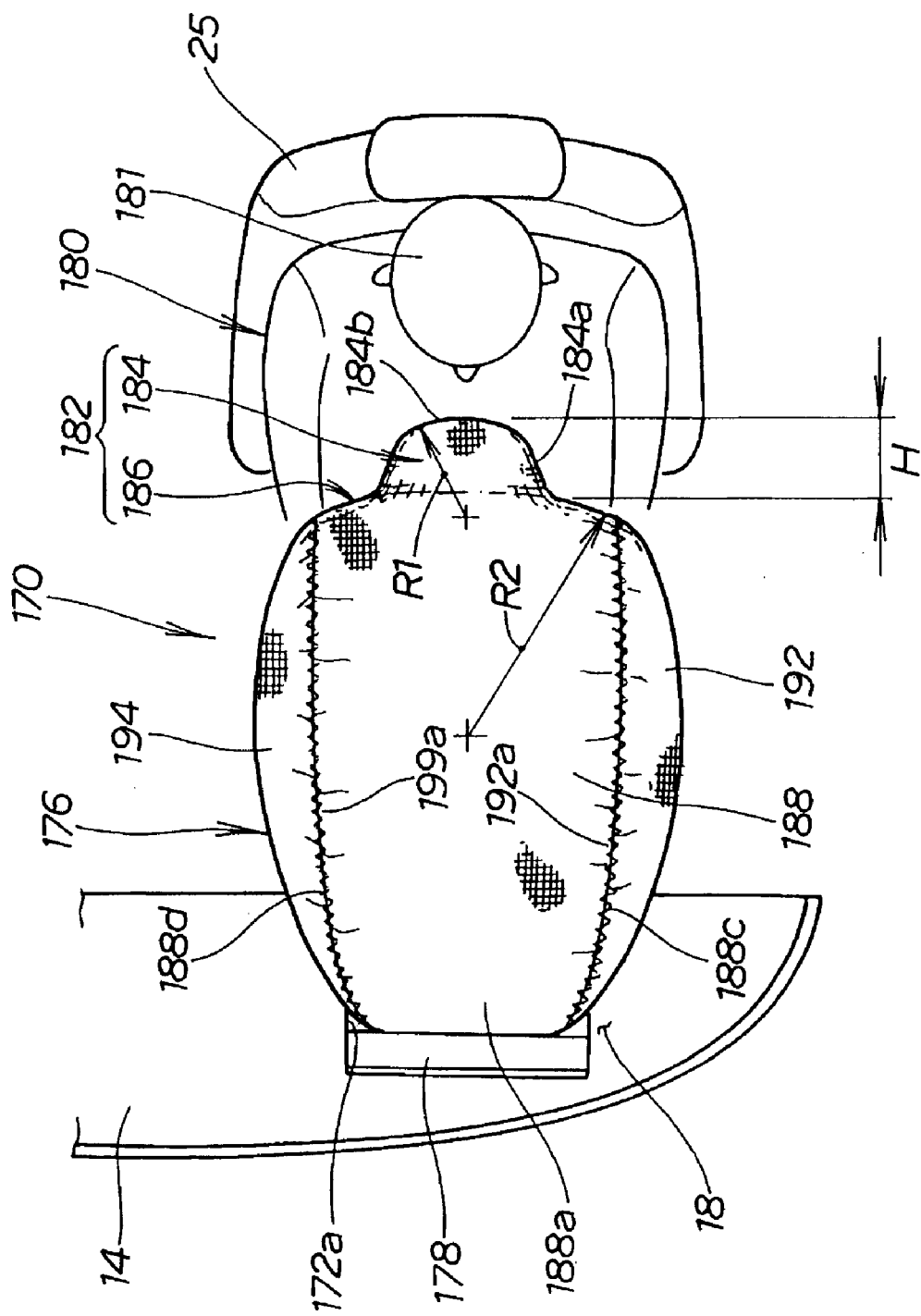
FIG. 11 is a plan view of FIG. 10.

As better shown in FIG. 11, the airbag 176 is formed by three pieces of fabric that are joined together by sewing into a bag-like configuration. More particularly, the airbag 176 is formed by an elongated strip-like central fabric member 188 and left and right fabric members 192 and 194 connected by sewing stitches to opposite side edges of the central fabric member 188 so that the left and right fabric members 192, 194 form left and right sidewalls of the airbag 176 and the central fabric member 188 forms a peripheral wall including the occupant restraint surface 182 of the airbag 176. The semispherical top wall 184*b* of the head-protection protrusion 184 has a radius of curvature R1 which is much smaller than a radius of curvature R2 of the convexly curved restraint surface portion 186 of the occupant restraint surface 182.

Restraint forces of the head-protection protrusion 184 and the convexly curved restraint surface portion 186 that may be exerted respectively on the head 181 and the chest (not designated) of the occupant 180 are proportional to the radii of curvature R1 and R2 of the head-protection protrusion 184 (measured as at the semispherical top wall 184*b*) and the convexly curved restraint surface portion 186. As mentioned previously, the radius of curvature R1 of the head-protection protrusion 182 as measured at the top wall 184*b* thereof is much smaller than the radius of curvature R2 of the convexly curved restraint surface portion 186. It is, therefore, possible to set the restraint force of the head-protection protrusion 184 (top wall 184*b*, in particular) to be much smaller than the restraint force of the convexly curved restraint surface portion 186. The restraint force of the convexly curved restraint surface portion 186 represents a restraint force of the occupant restraint surface 182 as a whole. The restraint force of the top wall 184*b* of the head-protection protrusion 182 will be hereinafter referred to as "end face restraint force" while the restraint force of the entire occupant restraint surface 182 will be hereinafter referred to as "overall restraint force".

The end face restraint force is dependent on a membrane tension acting on the end wall 184*b* of the head-protection protrusion 184 (i.e., a tensile force created in the fabric of the airbag 176 by the internal pressure of the airbag 176) when the airbag 176 is deployed by the high-pressure gas. More particularly, if P1 represents the end face restraint force, R1 represents the radius of curvature of the head-protection protrusion 184 as measured at the top wall 184*b*, and p represents the pressure of the high-pressure gas, then the end face restraint force P1 is expressed as:

$$P1 \propto = p \times R1 \qquad (1)$$

On the other hand, the overall restraint force is dependent on a membrane tension acting on the convexly curved restraint surface portion 186 of the occupant restraint surface 182 when the airbag 176 is deployed by the high-pressure gas. More particularly, if P2 represents the overall restraint force, R2 represents the radius of curvature of the occupant restraint surface 162 as measured at the convexly curved restraint surface portion 186 thereof, and p represents the pressure of the high-pressure gas, then the overall restraint force P2 is expressed as:

$$P2 \propto = p \times R2 \qquad (2)$$

Since R1<R2, it is determined from the expressions (1) and (2) that P1<P2.

Thanks to the end face restraint force P1, which is smaller than the overall restraint force P2, the airbag device 170 is able to restrain the occupant 180 by means of the airbag 176 such that the head 181 is softly restrained by the head-protection protrusion 184.

Figure 12:
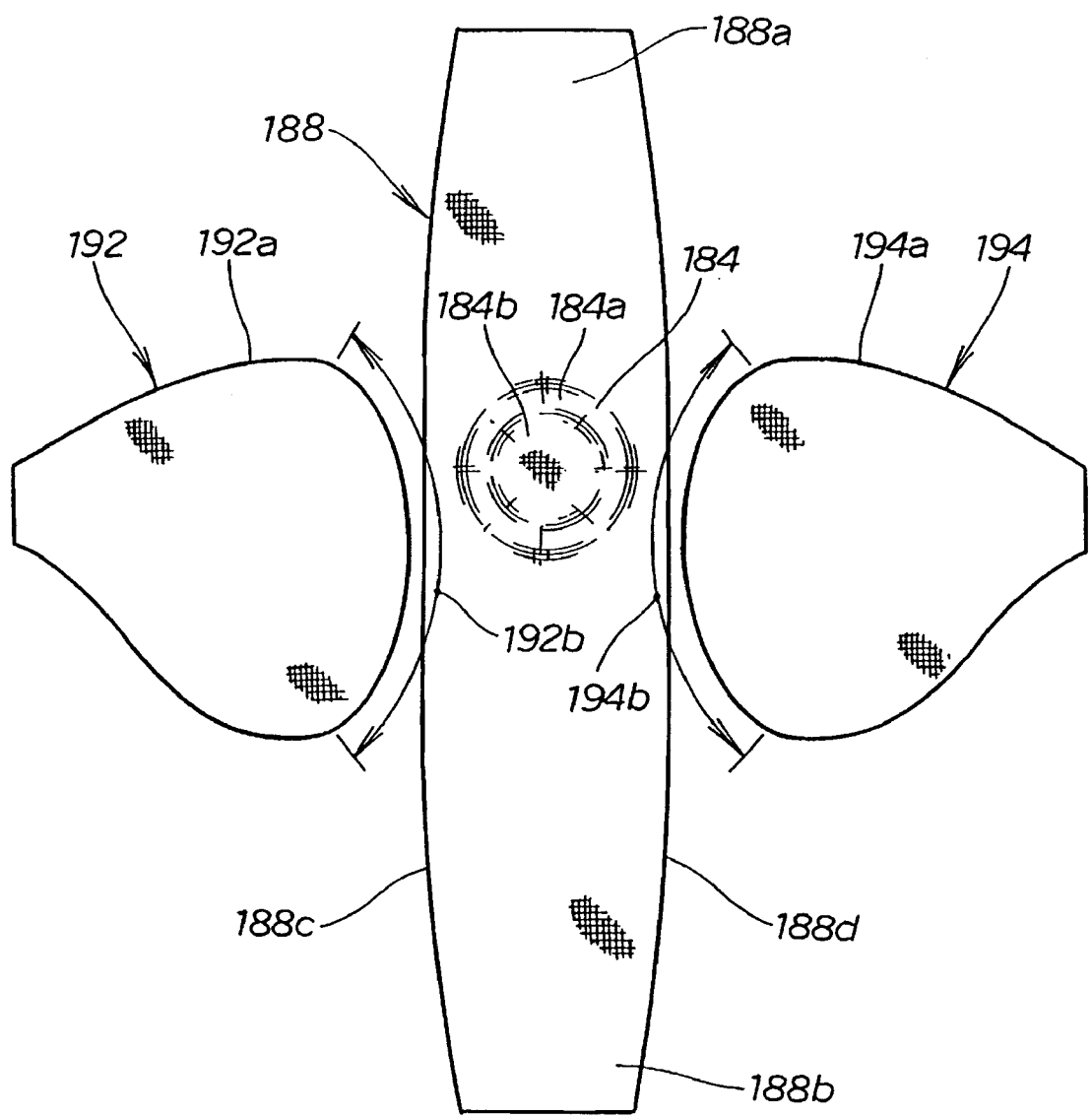
FIG. 12 is a development view of an airbag of the airbag device shown in FIG. 9.

As shown in FIG. 12, the elongated strip-like central fabric member 188 of the airbag 176 (FIG. 11) has a uniform width except at its opposite end portions 188*a* and 188*b*, which are gradually narrowed or tapered toward opposite tip ends of the central fabric member 188. The central fabric member 188 is a three-dimensional woven fabric produced by a three-dimensional weaving system so that a central portion of the central fabric member 188 protrudes from one surface thereof into a circular dome-like configuration. The thus protruded dome-like central portion will constitute a head-protection protrusion 184 of a finished airbag 176.

The left fabric member 192 is cut into a substantially triangular shape. Peripheral edge 192*a* of the substantially triangular left fabric member 192 includes a portion 192*b* so curved as to match the curvature of the convexly curved restraint surface portion 186 (FIG. 10) of the airbag 176. The right fabric member 194 is identical in shape and configuration with the left fabric member 192 but it is arranged in symmetrical relation to the left fabric member 192 about a longitudinal centerline of the central fabric member 188. Thus, peripheral edge 194*a* of the right fabric member 194 has a portion 194 so curved as to match the curvature of the convexly curved restraint surface portion 186 (FIG. 10) of the airbag 176.

For assembly, a left side edge 188*c* of the central fabric member 188 and the peripheral edge 192*a* of the left fabric member 192 are joined together by sewing. Similarly, a right side edge 188*d* of the central fabric member 188 and the peripheral edge 194*a* of the right fabric member 194 are joined together by sewing. By thus joining the three fabric members 188, 192, 194, an airbag 176 (FIGS. 10 and 11) is produced. Since the head-protection protrusion 184 is automatically produced in the course of production of the central fabric member 188, and since configurations of the left, central and right fabric members 188, 192, 194 are very simple, the airbag 176 can be manufactured easily in a relatively short period of time.

Figure 13A:
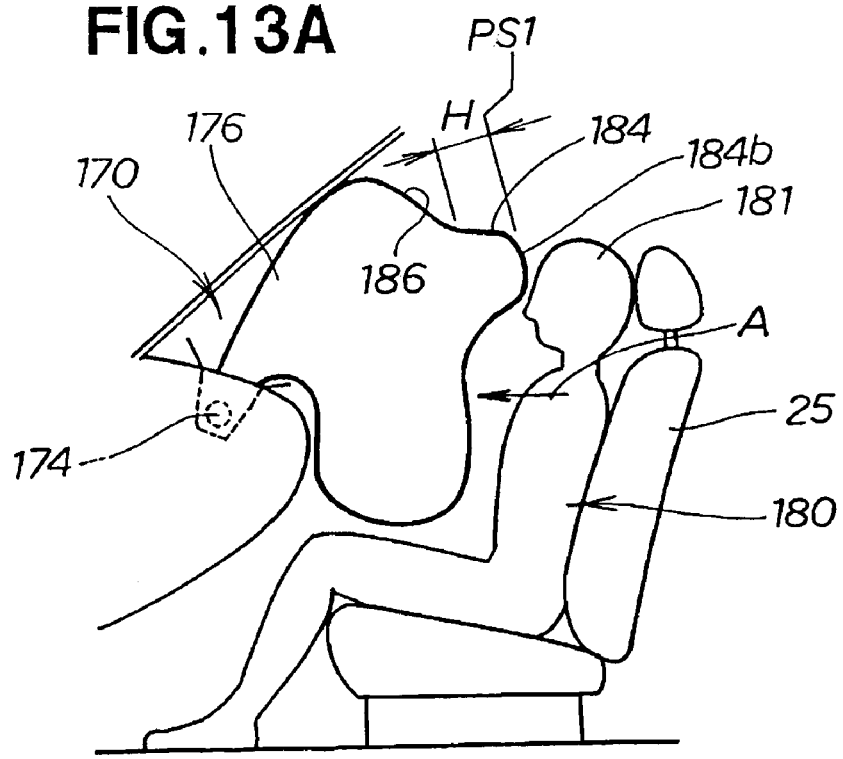
FIGS. 13A to 13D are diagrammatical view showing the operation of the airbag device of FIG. 10.

Operation of the airbag device 170 will be described with reference to FIGS. 13A to 13D. As shown in FIG. 13A, in a car crash, the inflator 174 is fired to inflate the airbag 176. The airbag 176 is fully inflated before the occupant 180 contacts the airbag 176 while it is moving forward as indicated by the arrow A. In this instance, the top wall 184*b* of the head-protection protrusion 184 is located at a position PS1 which is spaced outward from the convexly curved restraint surface 186 by a distance H.

Figure 13B:
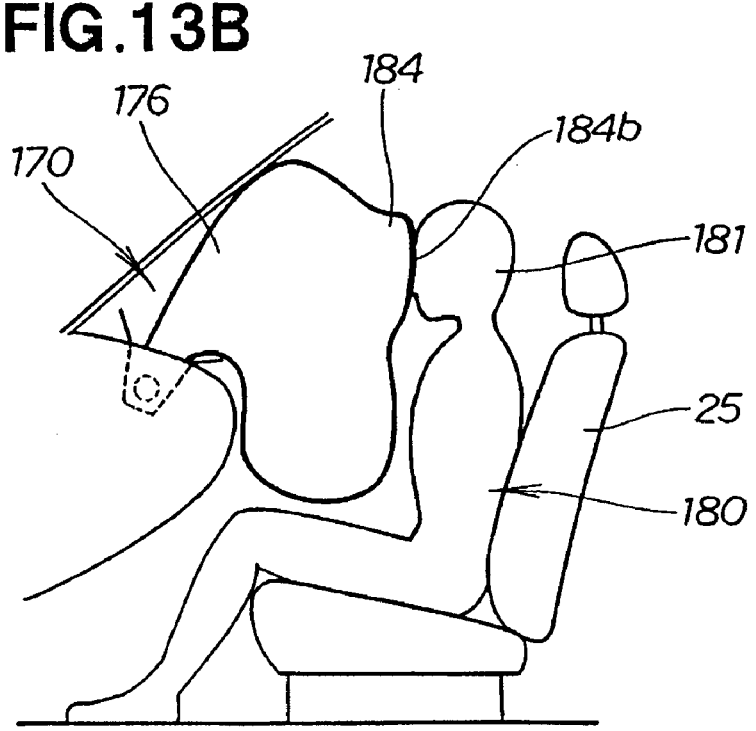

Shortly thereafter, the head 181 of the occupant 180 contacts the top wall 184*b* of the head-protection protrusion 184 and continues to sink deeply into the head-protection protrusion 184, as shown in FIG. 13B. In this instance, since the end face restraint force of the head-protection protrusion 186 as measured at the top wall 184*b* is smaller than the overall restraint force of the occupant restraint surface 182 as measured at the convexly curved restraint surface portion 186, the occupant's head 181 is softly restrained by the head-protection protrusion 184 while it is moving forward. Furthermore, since the head-protection protrusion 184 protrudes forward from the convexly curved restraint surface 186 by the distance of H (FIG. 13A), it is possible to start restraint of the occupant's head 181 at early stages of collision prior to the start of restraint protection of an upper part (chest in particular) of the occupant body. This is particularly effective for protection of the occupant's head 181.

Figure 13C:
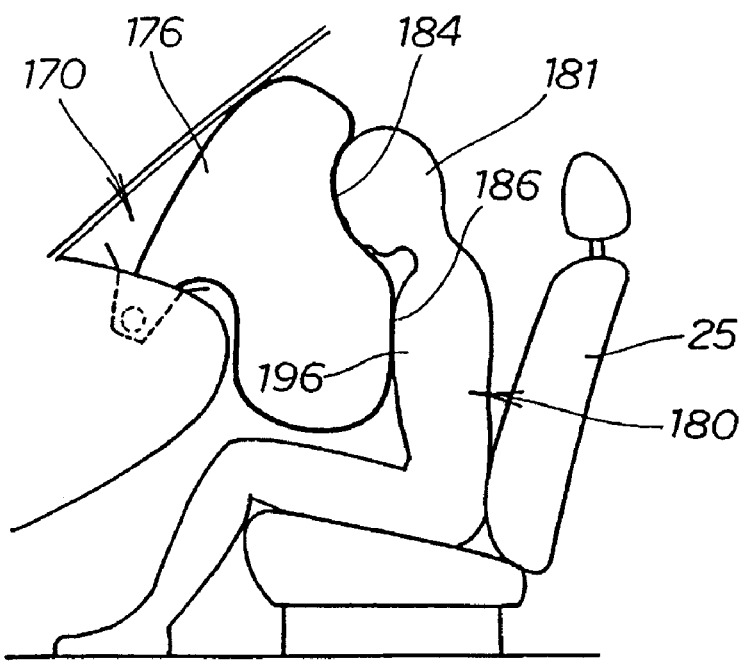

As the forward movement of the occupant 180 further proceeds, the head 181 of the occupant 180 sinks deeper into the head-protection protrusion 184 and the upper part 196 of the occupant body contacts the curved restraint surface portion 186 of the airbag 176, as shown in FIG. 13C. In this instance, the head-protection protrusion 184 is already distorted flat at a position located interiorly of the restraint surface portion 186 of the airbag 176.

Figure 13D:
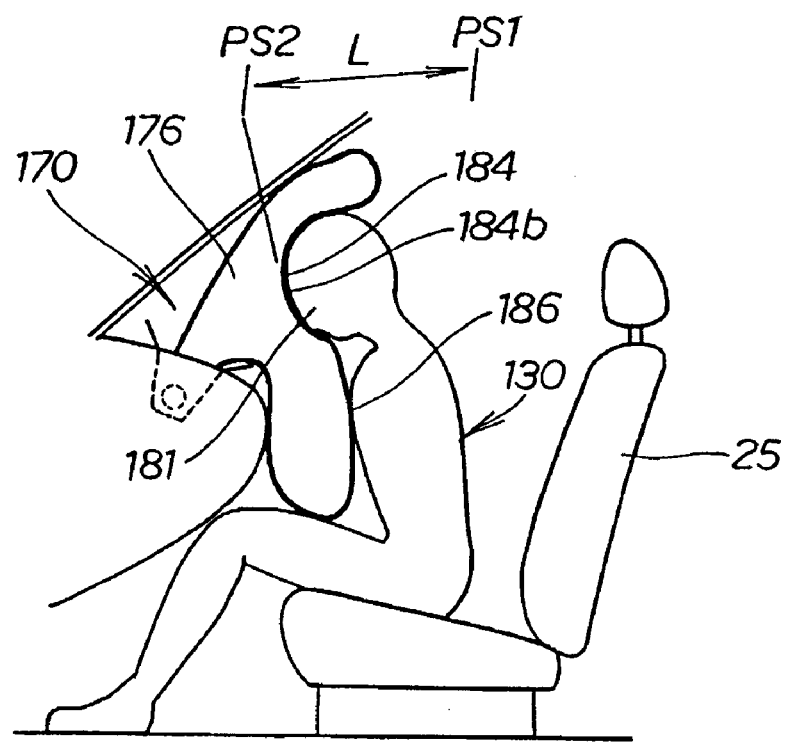

Upon contact with the occupant's upper body portion 196, the airbag 176 begins to deflate via vent holes (not shown but identical with the openings 45 shown in FIG. 2). The occupant 180 continues to sink deeply into the airbag 176 which cushions the head 181 and the upper body portion 196 (chest in particular) with the head-protection protrusion 184 and the restraint surface portion 186, respectively, while it is deflating, as shown in FIG. 13D. At the final stage of collision shown in FIG. 13D, the top wall 184b of the head-protection protrusion 184 is located at a position PS2, so that the top wall 184b has been displaced from the original position P1 (at the early stages of collision) by a distance H. By virtue of the head-protection protrusion 184, the airbag 176 is able to offer a long restraint protection stroke to the head 181 of the occupant 180 as compared to those in the foregoing embodiments, which are free from protrusions.

Figure 14:
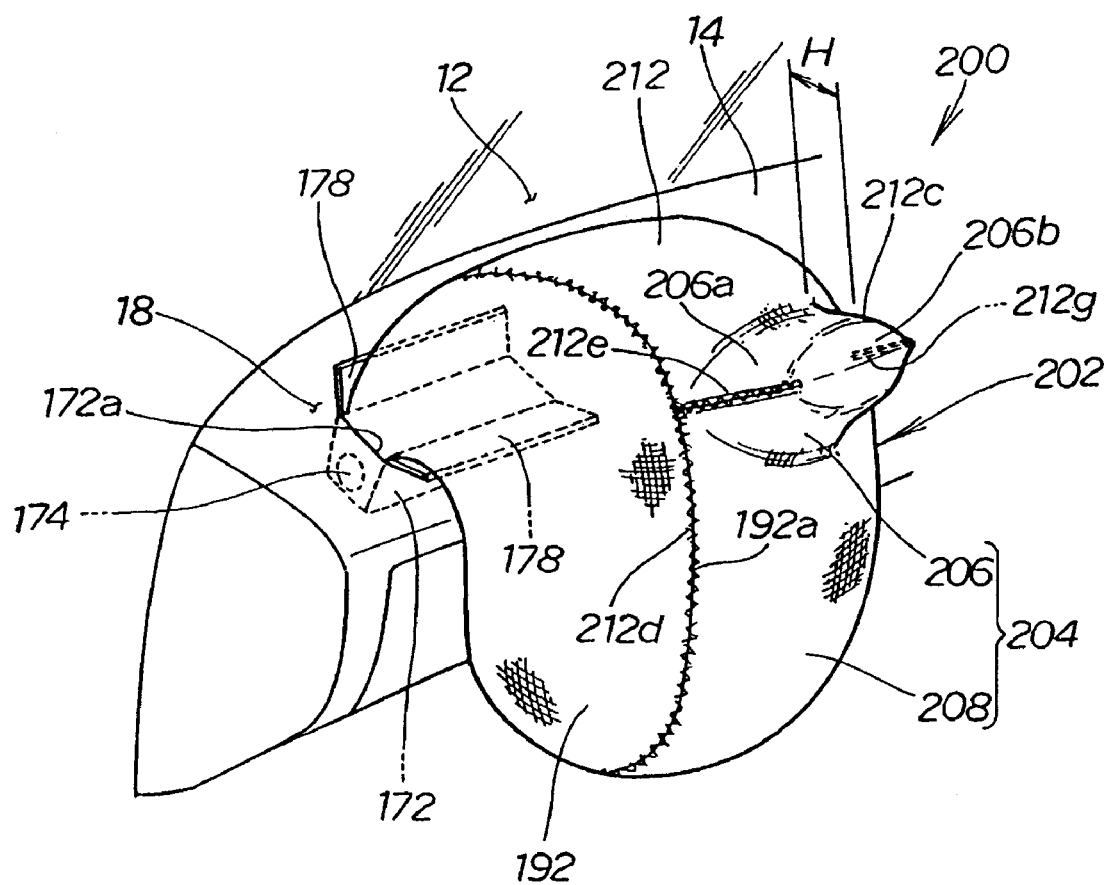
FIG. 14 is a perspective view showing an airbag device according to a seventh embodiment of the present invention.

FIG. 14 shows in perspective an airbag device 200 according to a seventh embodiment of the present invention. In FIG. 14, the airbag device 200 is shown with parts in a deployed position. In this figure, the same reference characters designate these parts, which are identical to those used in the fifth embodiment shown in FIG. 10, and a further description thereof can be omitted.

The airbag device 200 differs from the airbag device 170 of FIG. 10 in the structure of an airbag 202. In a deployed state, the airbag 202 has an occupant restraint surface 204 facing an upper part of the occupant body (see FIG. 10). The occupant restraint surface 204 includes a convexly curved surface portion 208 forming a main part of the occupant restraint surface 204, and a head-protection protrusion 206 protruding forward from the restraint surface portion 208. The head-protection protrusion 206 is located at a position substantially corresponding to the position of the occupant's head (see FIG. 10) and has a height H. The head-protection protrusion 206 has a peripheral wall 206a of elliptical shape in cross section and a semi-elliptical top wall 206b.

Figure 15:
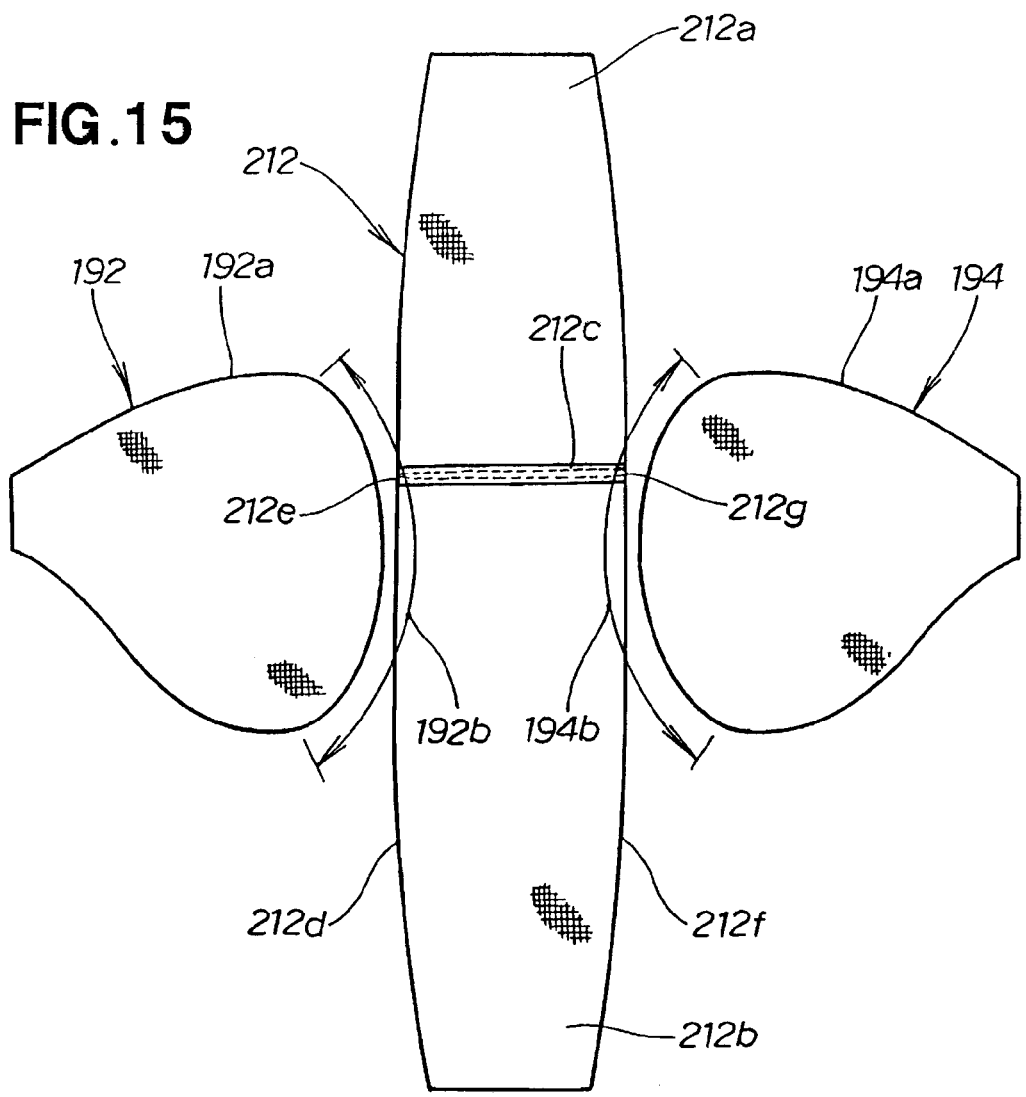
FIG. 15 is a development view of an airbag of the airbag device shown in FIG. 14.

Like the airbag 176 shown in FIG. 10, the airbag 202 is formed by three pieces of fabric, i.e., a left fabric member 192, a central fabric member 212, and a right fabric member 194 (FIG. 15). As shown in FIG. 15, the central fabric member 212 has an elongated strip-like configuration having a uniform width except at its opposite end portions 212a and 212b, which are gradually narrowed or tapered toward opposite tip ends thereof. The central fabric member 212 has a folded part or fold 212c at an intermediate portion thereof, the fold 212 extending in a widthwise direction of the central fabric member 212. The left and right fabric members 192 and 194 are identical to those of the airbag 176 shown in FIG. 10.

Figure 16:
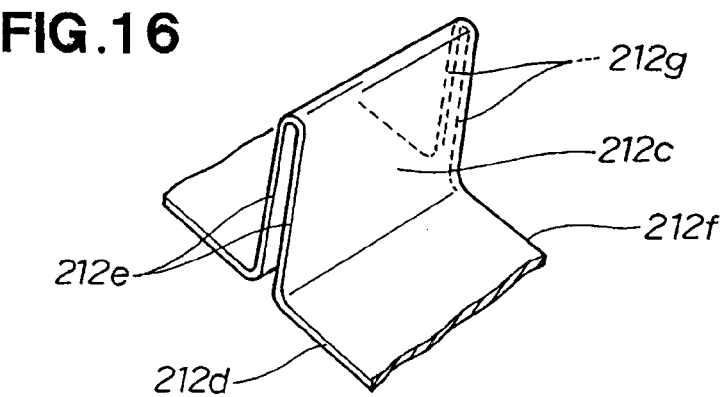
FIG. 16 is a perspective view showing a fold formed on a central fabric member of the airbag of FIG. 14.

For assembly, a left side edge 212d of the central fabric member 212 and a peripheral edge 192a of the left fabric member 192 are joined together by sewing while the intermediate portion of the central fabric member 212 is kept folded to form the fold 212c (see FIG. 16). Then, a left edge 212e of the fold 212 is closed by stitching. Similarly, a right side edge 212f of the central fabric member 212 and a peripheral edge 194a of the right fabric member 194 are joined together by sewing, and a right edge 212g of the fold 212c is closed by stitching. By thus joining the three fabric members 212, 192, 194, an airbag 202 (FIG. 14) is produced. When the airbag 202 is inflated with high-pressure gas, the head-protection protrusion 206 is automatically produced. The head-protection projection 206 can be produced only by making a fold 212c on the fabric of the airbag 202 without requiring the three-dimensional weaving system, which is expensive. Accordingly, the airbag 202 can be produced at a lower cost than the airbag 176 of the foregoing embodiment shown in FIG. 10.

Figure 17:
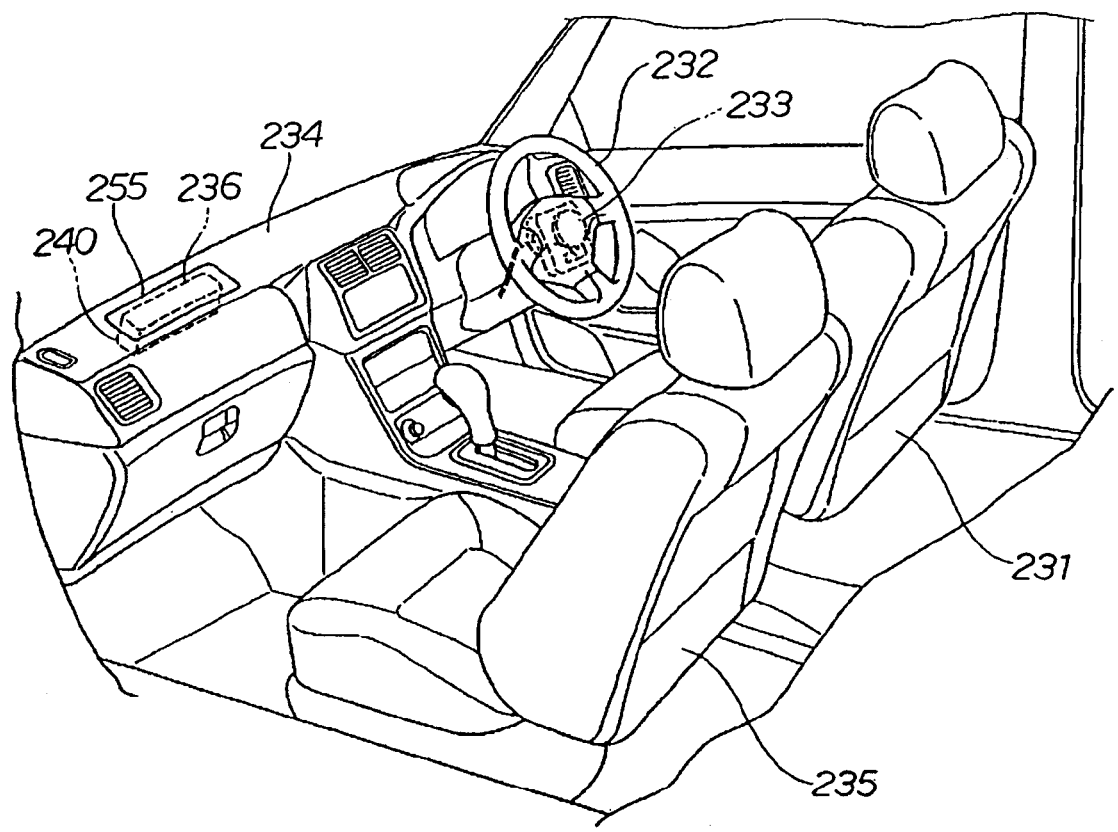
FIG. 17 is a perspective view of a passenger compartment of a motor vehicle in which an airbag device according to an eighth embodiment of the present invention.

Next, an airbag device according to an eighth embodiment of the present invention will be described below with reference to FIGS. 17 to 24. As shown in FIG. 17, a motor vehicle includes a driver-side airbag module or device 233 installed in a steering wheel 232 for restraint protection of a driver sitting on a driver seat 231, and a passenger-side airbag module or device 236 installed in a dashboard or instrument panel 234 above a glove box for restraint protection of a passenger or occupant sitting on a front passenger seat 235. The passenger-side airbag device 236 constitutes an airbag device of this embodiment.

Figure 18:
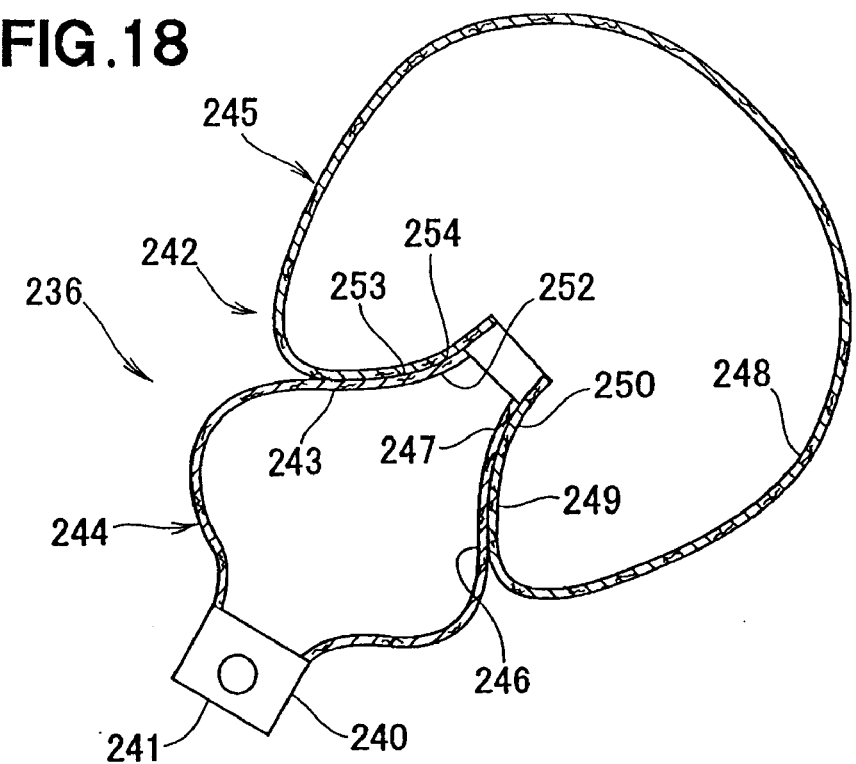
FIG. 18 is a sectional side elevation of the airbag device of FIG. 17 with parts shown in a deployed position.
Figure 19:
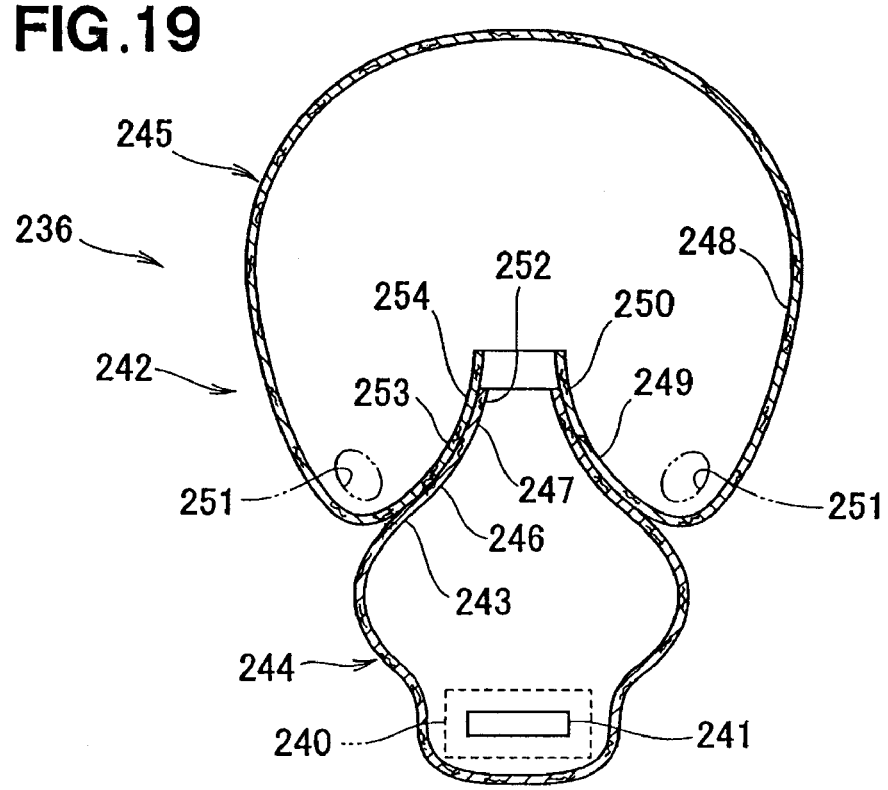
FIG. 19 is a plane cross section of FIG. 18.

The airbag device 236, as shown in a deployed state in FIGS. 18 and 19, includes a case 240, an inflator 241 disposed in a case 240 for generating high-pressure gas upon firing or activation, and an airbag 242 normally received in the case 240 in a folded condition and inflatable with the high-pressure gas generated by the inflator 241.

The airbag 242 includes a first bag 244 connected at one end to the case 20 for directly receiving therein the high-pressure gas generated by the inflator 241, and a second bag 245 connected to the opposite end of the first bag 244 for receiving therein the high-pressure gas via the first bag 244. The first and second bags 244 and 245 are sewn products of fabric material. The first bag 244 forms a guide passage 253 for guiding the high-pressure gas into the second bag 245, and the second bag 245 can deploy by the high-pressure gas introduced therein through the first bag 244.

The first bag 244 has a generally barrel-like configuration including a first half (not designated but lower half in FIGS. 18 and 19) extending between a proximal end connected to the inflator 241 and a central portion of the first bag 244, and a second half 246 (upper half in FIGS. 18 and 19) extending between the central portion and a distal end connected to the second bag 245. The first half has a diameter progressively increasing in a direction from the proximal end toward the central portion of the first bag 244, and the second half 246 has a diameter decreasing progressively in a direction from the central portion toward the distal end of the first bag 244. The second half 246 of the barrel-like first bag 244 will be hereinafter referred to as "convergent portion". The convergent portion 246 has a tip end portion shaped to form a first communicating hole part 247 of tapered tubular configuration having a circular hole at a distal end thereof. An internal surface of the first communicating hole part 247 has a streamlined tapered tubular configuration progressively reducing in diameter toward the second bag 245. The streamlined internal surface of the first communicating hole part 247 forms a flow control portion 252, which functions to rectify flow of the high-pressure gas generated from the inflator 241 and direct the gas toward the second bag 245. The streamlined flow control portion 252 further functions to accelerate the gas flow.

The second bag 245 includes a body portion 248 of substantially spherical configuration having a diameter increasing progressively in a first area extending between one end remote from the first bag 244 and a central portion and decreasing progressively in a second area extending between the central portion and the other end adjacent to the first bag 244, and a turnup portion 249 integral with the body portion 248 and folded back into the body portion 248 at the other of the latter. The turnup portion 249 has a tip end portion (inner end portion) shaped to form a second communicating hole part 250 of tapered tubular configuration having a circular hole at a distal end thereof. The second bag 245 has a plurality of vent holes (openings) 251 formed therein at a portion adjacent to the turnup portion 249 so as to provide a fluid communication between the interior and exterior of the second bag 245.

The first communicating hole part 247 is inserted in the second communication hole part 250 so that the first and second communicating hole parts 247 and 250 overlap each other. While keeping this condition, the first and second communicating hole parts 247 and 250 are connected together by adhesive bonding, for example, at their portions spaced at intervals in a circumferential direction of the communicating hole parts 247, 250, in order to joint together the first bag 244 and the second bag. By thus joining the two bags 244, 255 together, the first communicating hole part 247 projects from the first bag 244 into the second bag 245, and the second communicating hole part 250 projects from the second bag 245 into the internal space of the second bag 245. Circumferential portions of the first and second communicating hole parts 247 and 250 that are not connected together by adhesive bonding may define gaps therebetween, which jointly form a branch passage 254 disposed downstream of, and branched off from, the flow control portion 252 for allowing the high-pressure gas to escape from the airbag 242, as will be described later in detail. The unconnected circumferential portions of the first and second communicating hole parts 247 and 250 also form an on-off valve 253 disposed in the branch passage 254 and operable to discharge the high-pressure gas from the second bag 245 through the branch passage 254 because they are overlapped with each other (to assume an "off" or closed state) but they are able form gaps therebetween (to assume an "on" or open state) under certain conditions. The on-off valve 253 is provided between the first bag 244 and the second bag 245. The vent holes (openings) 251 formed in the second bag 245 are disposed in the proximity of the on-off valve 253.

The airbag 242 of the foregoing construction is received in a folded condition in the case 240 together with the inflator 241 to complete an airbag module or device 236. The airbag device 236 is installed in the dashboard 234 above the glove box (not designated), as shown in FIG. 17. In a car crash when acceleration of gravity not lower than a predetermined level is detected, the inflator 241 is fired to inflate the airbag 242 with high-pressure gas generated from the inflator 241. The airbag 242 breaks the case 240, splits open a cover 255, and immediately begins to deploy into a passenger compartment.

Figure 20:
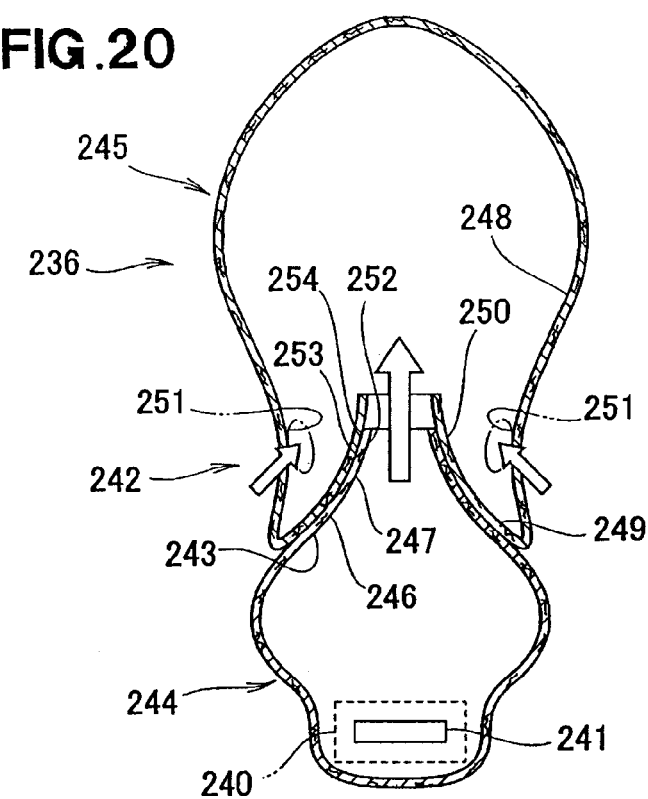
FIG. 20 is a view similar to FIG. 19, but showing the airbag device being in the process of deployment.

In this instance, since the high-pressure gas generated by the inflator 241 is directly supplied to the first bag 244, the first bag 244 inflates first, followed by inflation of the second bag 245, which is supplied with the high-pressure gas via the first bag 244. As shown in FIG. 20, the second bag 245 is able to draw in the surrounding air via the vent holes (openings) 251 by the effect of a partial vacuum created when the high-pressure gas flows from the first bag 244 into the second bag 255 (aspiration effect), thereby accelerating inflation of the second bag 245.

Figure 21:
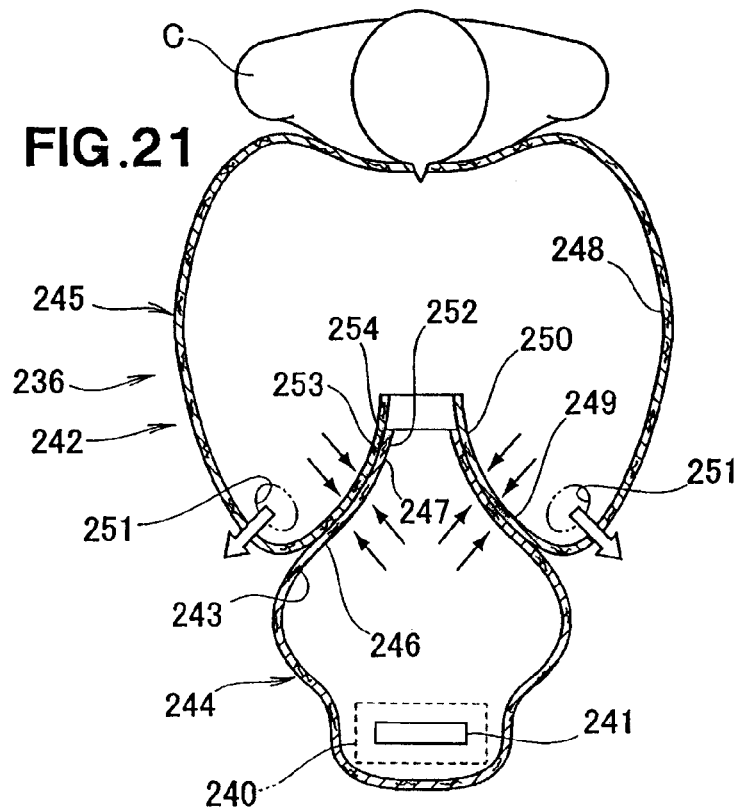
FIG. 21 is a plane cross section of the airbag device as it is deploying under normal conditions.

During deployment, if inflation of the second bag 245 proceeds without interruption (i.e., under the condition that a passenger C is properly setting on the front passenger seat 235 (FIG. 17) as shown in FIG. 21), deployment resistance does not increase. Thus, the first communicating hole part 247 projecting from the first bag 244 into the second bag 245 and the second communicating hole part 250 projecting from the second bag 245 into the second bag 245 are both able to deploy in an appropriate manner. Thus, the high-pressure gas, while being directed toward the second bag 245 by means of the flow control portion 252 provided inside the first communicating hole part 247, is not permitted to flow into the branch passage 254 which is oriented in a different direction. Furthermore, since the first communicating hole part 247 and the second communicating hole part 250 are subjected to internal pressure of the first bag 244 and internal pressure of the second bag 245, respectively, that act in opposite directions to bring together the first and second communicating hole parts 247 and 250, as indicated by arrows in FIG. 21, the on-off valve 253 formed by the first and second communicating hole parts 247 and 250 keeps its "off" or closed state, thus closing the branch passage 254. As a consequence, the first and second bags 244 and 245 further continue inflation so that the passenger C sitting on the front passenger seat 235 (FIG. 17) is restrained by the inflated airbag 242.

Figure 22:
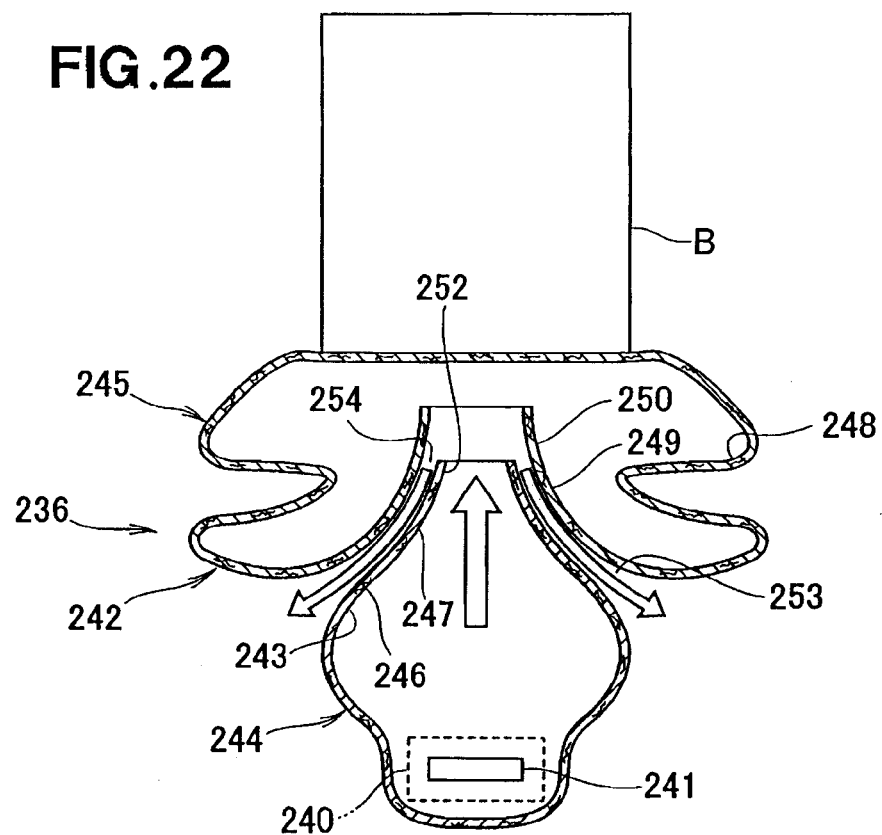
FIG. 22 is a plane cross section of the airbag device as it is deploying under unusual condition.

Alternatively, if inflation of the second bag 245 involves undesired interruption caused by an obstacle such as a package B having a larger size than the passenger C (FIG. 21) and placed on the front passenger seat 235 (FIG. 19), as shown in FIG. 22, deployment resistance increases rapidly. This will cause the on-off valve 253 to open, allowing the high-pressure gas to enter the branch passage 254 defined between the first communicating hole part 247 of the first bag 244 and the second communicating hole part 250 of the second bag 245. The high-pressure gas then spreads or widens the branch passage 254, so that the escape of high-pressure gas from the second bag 245 is accelerated. Further inflation of the second bag 245 can thus be avoided.

It will be appreciated that the airbag device 236 has a flow control portion 252 provided in the guide passage 243 of the first bag 244 for rectifying flow of the high-pressure gas generated by the inflator 241 and directing the high-pressure toward the second bag 245 while accelerating the same, and a branch passage 254 disposed downstream of the flow control portion 252 and branched off from the flow control portion 252 in a different direction headed away from the second bag 245 for allowing the high-pressure gas to escape from the second bag 245. With this arrangement, under normal deployment condition, the high-pressure gas, which has been rectified and directed toward the second bag 245 by means of the flow control portion 252, is not permitted to flow into the branch passage 254 but introduced smoothly and efficiently so that the second bag 245 inflates quickly and efficiently. Alternatively, if inflation of the second bag 245 involves undesired interruption caused by an obstacle such as a large-sized package B (FIG. 22) placed on the front passenger seat, the high-pressure gas is released from the second bag 245 through the branch passage 254 due to a pressure rise created within the second bag 245. By thus venting the second bag 245, undesired inflation of the second bag 245 can be avoided.

Furthermore, since the branch passage 254 for releasing the high-pressure gas from the second bag 245 is provided between the first bag 244 into which the high-pressure gas is directly supplied from the inflator 241, and the second bag 245 into which the high-pressure gas is supplied via the first bag 244, and since the branch passage 254 is provided with an on-off valve 253, the on-off valve is kept in an "off" or closed state unless the needs arises so that deployment of the second bag 245 can be performed with increased efficiencies. When the needs arises due, for example, to undesired interruption of inflation of the second bag by an obstacle such as a package placed on the front passenger seat, the on-off valve 253 is opened to thereby vent the high pressure gas rapidly from the second bag 245 through the branch passage 254.

While the on-off valve 253 is in the "on" or open state to perform venting operation, the first bag 244 is kept in a fully inflated condition because the on-off valve 253 is provided between the first bag 244 and the second bag 245.

Furthermore, the on-off valve 253 thus provided does not incur additional cost because the valve 253 is formed by and between the first communicating hole part 247 of the first bag 244 and the second communicating hole part 250 of the second bag 245 that are overlapped with each other to join together the first bag 244 and the second bag 245.

Moreover, by virtue of the vent holes (openings) 251 formed in the second bag 245 at a portion located near the on-off valve 253, the second bag 245 is able to draw in the surrounding air through the vent holes 251 by suction created when the high-pressure gas flows into the second bag 245 (aspiration effect). Thanks to the aspiration effect, the second bag 245 is inflated rapidly.

Figure 23:
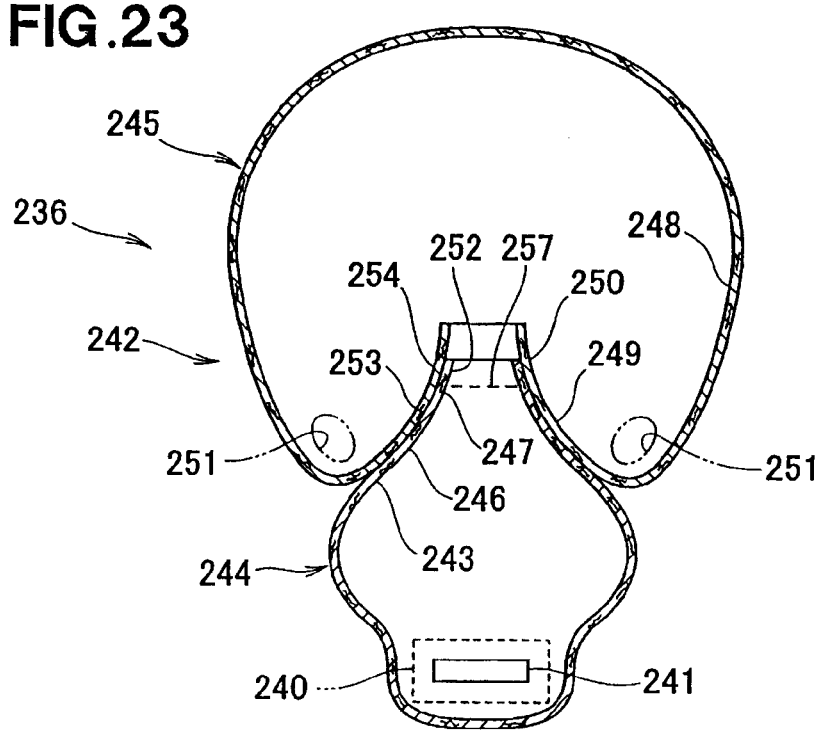
FIG. 23 is a view similar to FIG. 19 but showing a modification of the present invention.
Figure 24:
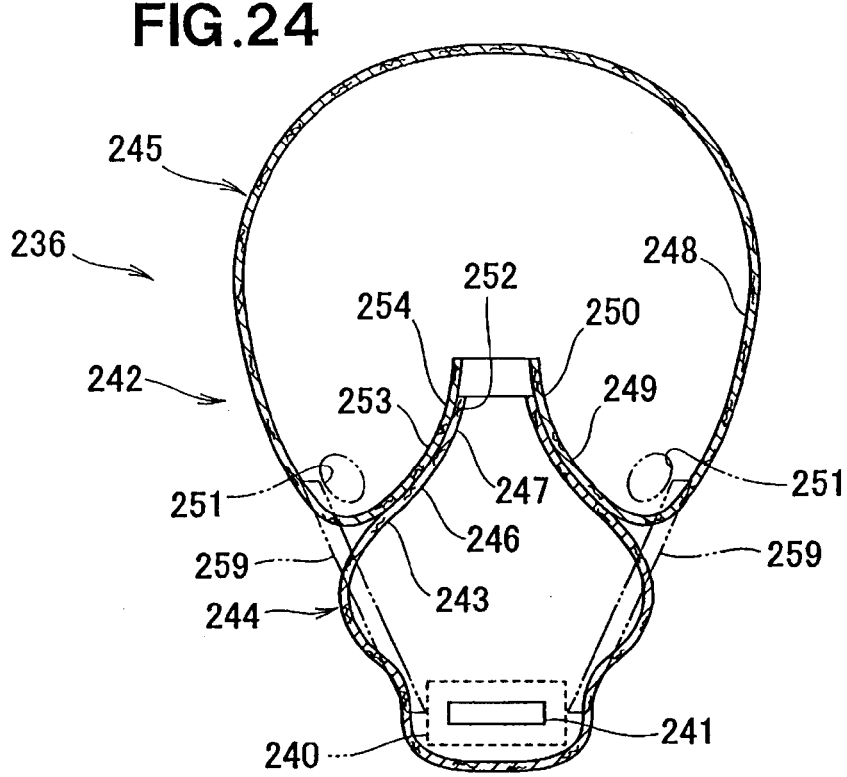
FIG. 24 is a view similar to FIG. 19 but showing another modification of the present invention.

In the embodiment just described above with reference to FIGS. 17 to 22, the first communicating hole part 247 of the first bag 244 and the second communicating hole part 250 of the second bag 245 are partially connected together by adhesive bonding at respective portions spaced at intervals in a circumferential direction thereof. The adhesive bonding used to join the first and second communicating hole parts 247 and 250 may be replaced by sewing stitches 257, as shown in FIG. 23. Alternatively, as shown in FIG. 24, straps 259 may be used in order to connect together the proximal end portion of the first bag 244 and the proximal end portion of the body portion 248 of the second bag 245 adjacent to the first bag 244 while the first communicating hole part 247 is kept inserted in the second communicating hole part 250. The straps 259 are arranged at regular intervals in a circumferential direction of the first and second communicating hole parts 247 and 250. With this arrangement, the first bag 244 and the second bag 245 are not connected at the respective communicating hole parts 247, 250 with the result that the on-off valve 253 is able to open and close the branch passage 254 over the entire circumference thereof. This will ensure rapid escape of the high-pressure gas from the second bag 245.

Figure 25:
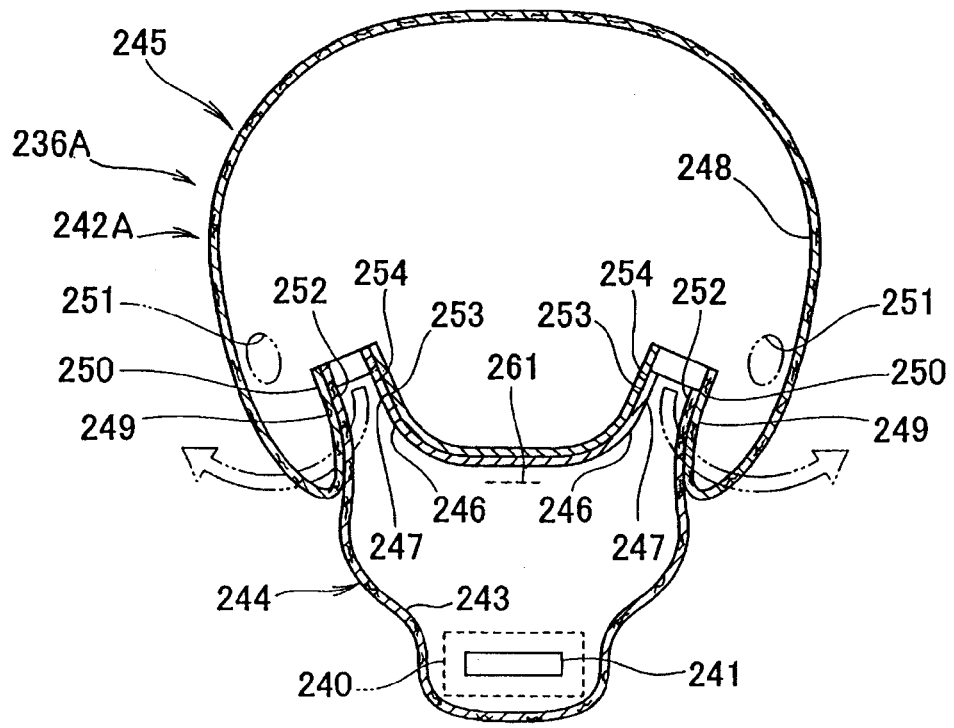
FIG. 25 is a plane cross section of an airbag device according to a ninth embodiment of the present invention, the view showing the airbag device as it is in a deployed state.

FIG. 25 shows an airbag device according to a ninth embodiment of the present invention. In FIG. 25, the same reference characters designate these parts, which are identical to those used in the eighth embodiment shown in FIG. 19, and a further description thereof can be omitted.

The airbag device 236A in this embodiment differs from the one 236 shown in FIG. 19 in that an airbag 242A includes a plurality (tow in the illustrated embodiment) of branch passages 254 and a corresponding number of on-off valves 253. As shown in FIG. 25, wherein the airbag 242A is in a deployed state, a first bag 244 is configured such that it diverges from a proximal end portion (where an inflator 241 is disposed) to a central portion, and branches off from the central portion into two convergent portions 246, 246. Each of the convergent portions 246 has a diameter reducing progressively in a direction toward a tip end thereof and includes a tip end portion shaped to form a first communicating hole part 247 of tapered tubular configuration having a circular hole at a distal end thereof.

A second bag 245 includes a body portion 248 of substantially spherical configuration and two turnup portions 249, 249 branched off from the body portion 248 and folded back into the body portion 248 at an end of the body portion 248 adjacent to the first bag 244. Each of the turnup portions 249 has a tip end portion (inner end portion) shaped to form a second communicating hole part 250 of tapered tubular configuration having a circular hole at a distal end thereof.

Each of first communicating hole parts 247 is inserted in a mating one of the second communication hole parts 250 so that the first and second communicating hole parts 247 and 250 in each pair overlap each other. The first and second communicating hole parts 247 and 250 in each overlapping pair can form a branch passage 254 and also jointly form an on-off valve 253 for releasing the high-pressure gas from the second bag 245. The on-off valve 253 is provided between the first bag 244 and the second bag 245.

The first bag 244 and the second bag 245 are connected together by sewing stitches 261 at respective portions located between two on-off valves 253 and 253. These parts of the first and second bags 244 and 245, which include or form the first and second communicating hole parts 247 and 250, are not connected together by the sewing stitches 261 so that each of the on-off valves 253 can open the corresponding branch passage 254 over the entire circumference thereof. In place of the sewing stitches 261, adhesive bonding or straps may be used to join together the first bag 244 and the second bag 245.

In the embodiment just described above, the number of the on-off valve 253 formed by the first and second communicating hole parts 247 and 250 is plural, and the first bag 244 and the second bag 245 are connected together at portions located between the adjacent on-off valves 253. With this arrangement, the first and second bags 244 and 245 do not require any joint formed at the first and second communicating hole parts 247 and 250 and, hence, the first and second communicating hole parts 247, 250 are relatively freely deformable. For instance, if inflation of the second bag 245 encounters undesired interruption during deployment, deployment resistance increases rapidly. Under such condition, the first communicating hole parts 247 will yield to the increased internal pressure of the second bag 245 and eventually slip out of the second communicating hole parts 250 in a radial outward direction of the second bag 245, as indicated by the profiled arrows shown in FIG. 25. Now, the high-pressure gas is allowed to escape from the second bag 245.

Figure 26A:
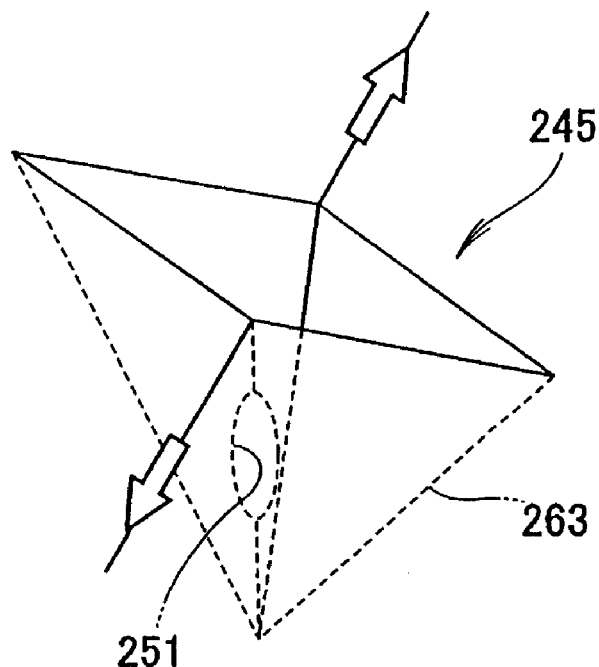
FIG. 26A is a perspective view showing a portion of an airbag including a vent hole as it is in a condition while the airbag is in a folded state.
Figure 26B:
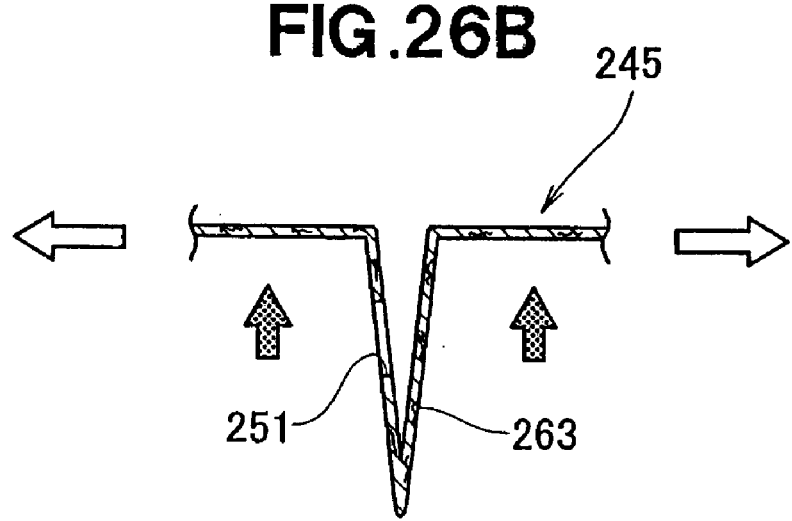
FIG. 26B is a cross-sectional view FIG. 26A.
Figure 27A:
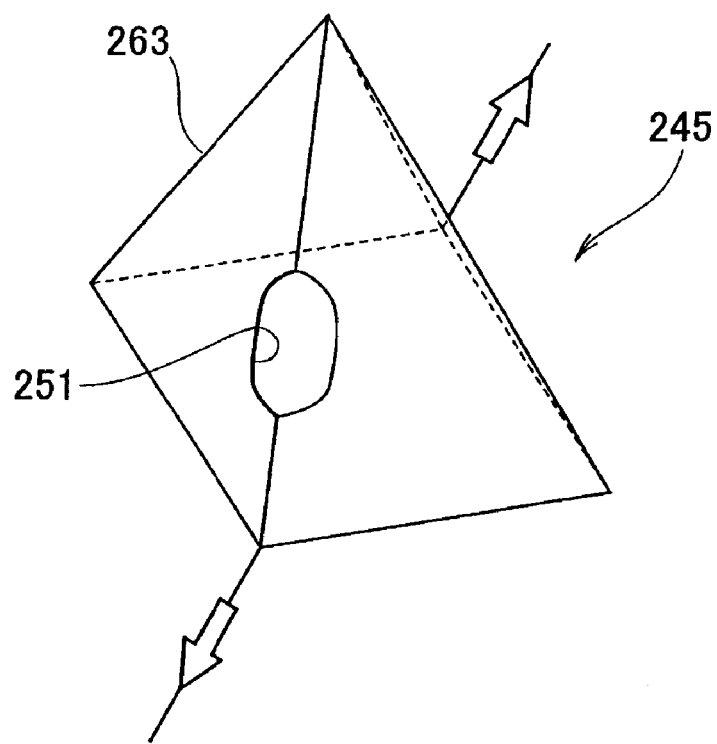
FIG. 27A is a view similar to FIG. 26A, but showing a condition when the bag is deployed.
Figure 27B:
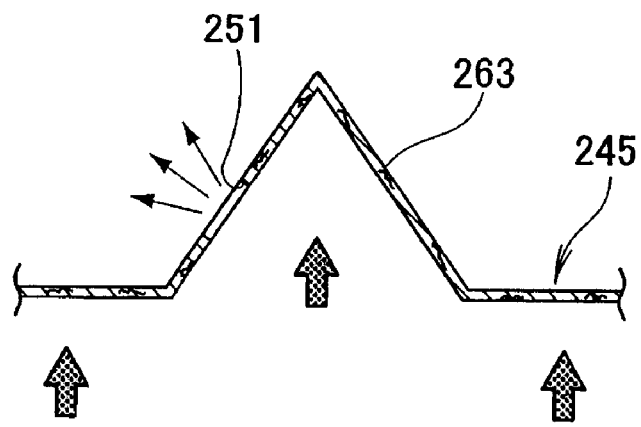
FIG. 27B is a cross-sectional view of FIG. 27A.

As shown in FIGS. 26B and 27B, the vent holes 251 may be formed in a folded portion 263 on the second bag 245. While the second bag 245 is in the folded state, the folded portion 263 is folded inward of the second bag 245, as shown in FIGS. 26A and 26B. When internal pressure of the second bag 245 goes up to a predetermined value during deployment of the airbag, the folded portion 265 is inverted due to an increased fabric tension and projects outward from the surrounding area of the second bag 245 like a pyramid, as shown in FIGS. 27A and 27B. With this arrangement, as long as the folded portion 263 is folded inward of the second bag 245, it is possible to prevent the high-pressure gas from escaping from the second bag 245.

Figure 28:
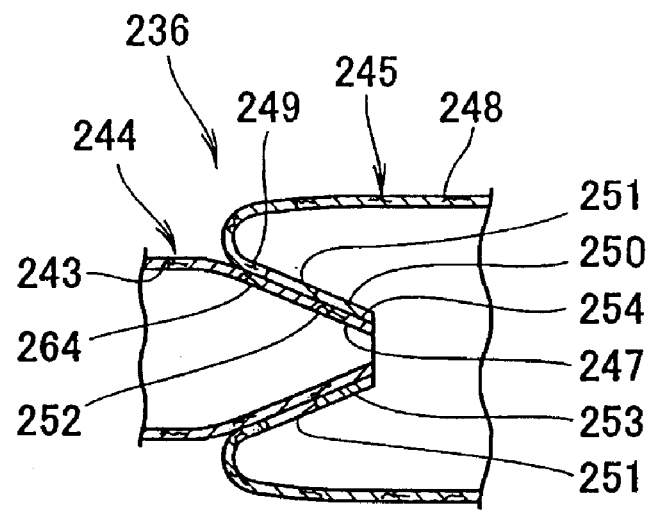
FIG. 28 is a cross-sectional view showing a portion of an airbag including vent holes at early stages of deployment of the airbag.
Figure 29:
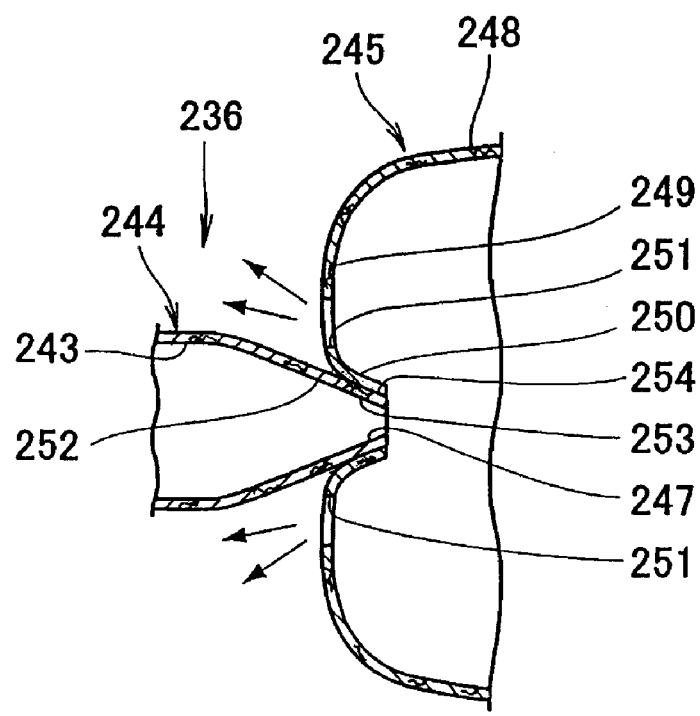
FIG. 29 is a cross-sectional view showing the airbag portion of FIG. 28 at the final stages of deployment of the airbag.
Figure 30:
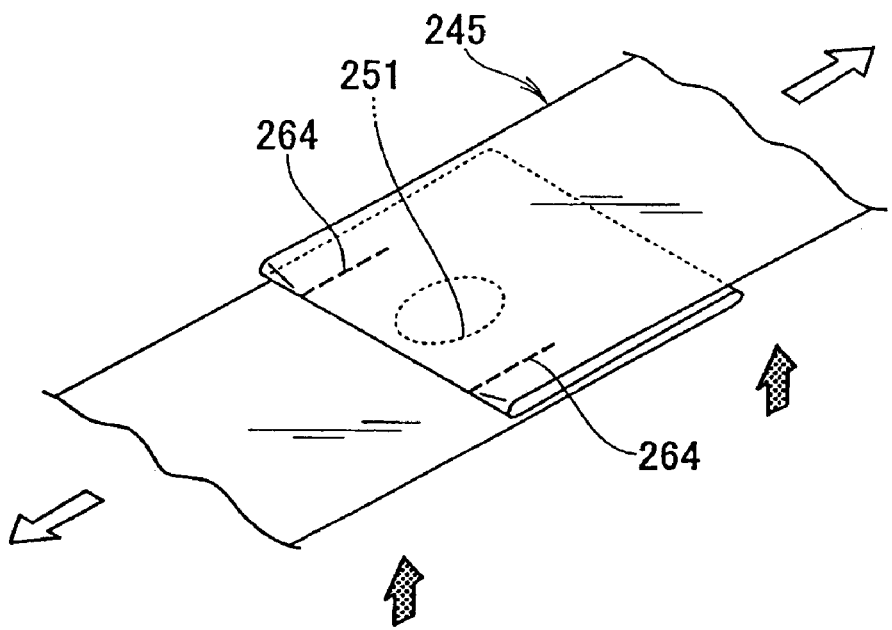
FIG. 30 is a perspective view showing a portion of an airbag including a vent hole as it is in an initial condition while the airbag is in a folded state.
Figure 31:
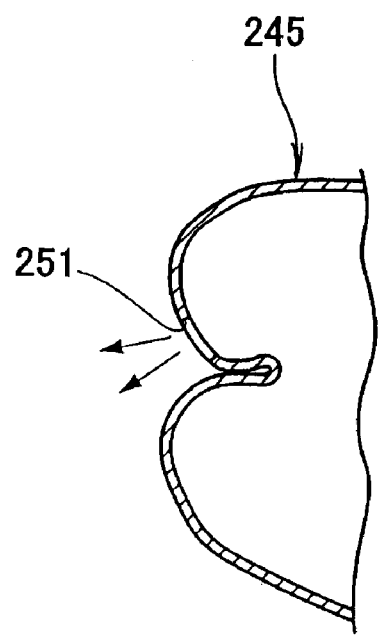
FIG. 31 is a cross-sectional view of the airbag portion of FIG. 20 while the airbag is being deployed.

As an alternative, the vent holes 251 may be formed at a portion of the second bag 245, which remains overlapped with the first communicating hole part 247 of the first bag 244 to thereby close the vent holes 251, as shown in FIG. 28, until internal pressure of the second bag reaches a predetermined value, and which separates from the first communicating hole part 247 of the first bag 244 to thereby open the vent holes 251, as shown in FIG. 29, when the internal pressure of the second bag exceeds the predetermined value. Alternatively, as shown in FIG. 30, the vent hole 251 may be formed in a folded portion, which is initially fixed by sewing stitches 264 to the fabric of the second bag 245 in such a manner that the vent hole 251 is closed by the fabric of the folded portion. When internal pressure of the second bag goes up to the predetermined value, the sewing stitches 264 are broken continued inflation of the second bag 245 and the vent hole 51 is opened as shown in FIG. 31.

Figure 32:
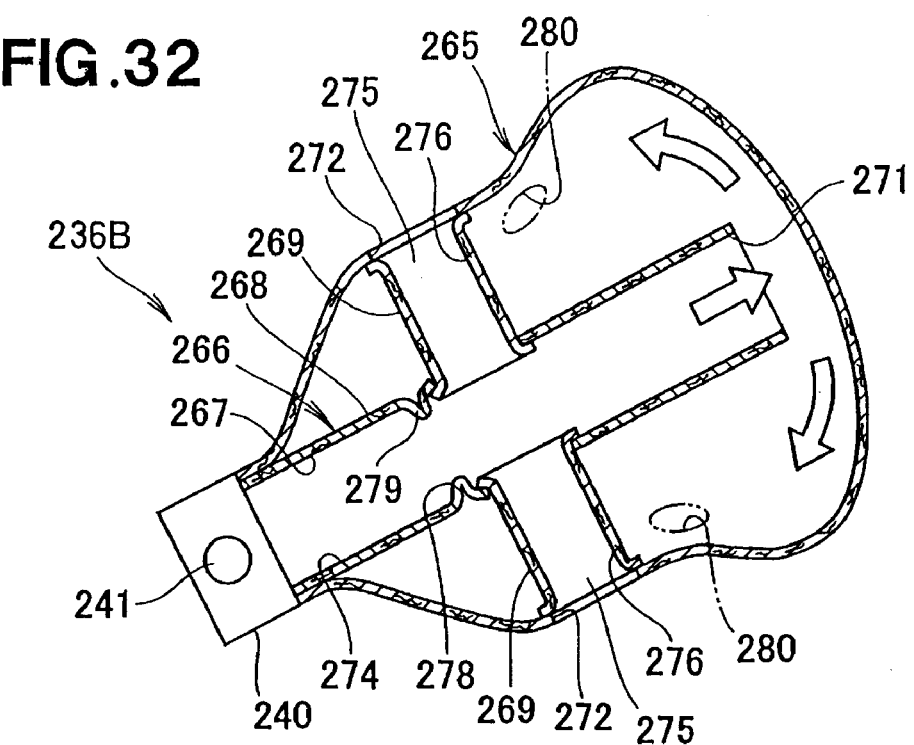
FIG. 32 is a sectional side elevation of an airbag device according to a tenth embodiment of the present invention, the view showing the airbag device as it deploying under normal conditions.
Figure 33:
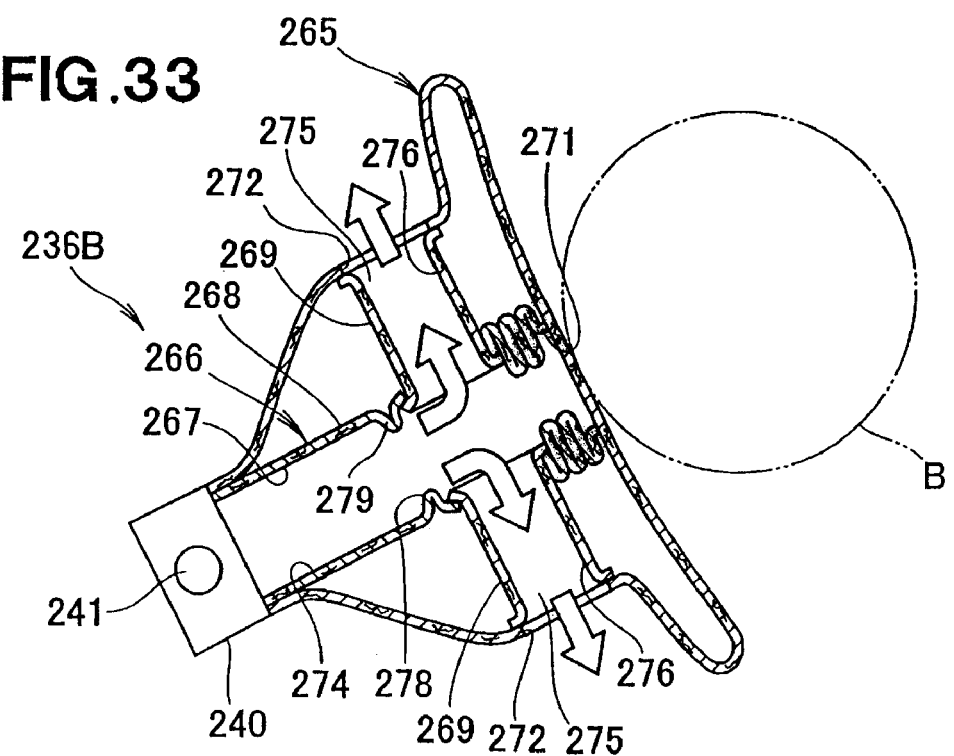
FIG. 33 is a view similar to FIG. 32, but showing the airbag device as it is deploying under unusual condition.

Next, an airbag device according to a tenth embodiment of the present invention will be described below with reference to FIGS. 32 and 33. In FIGS. 32 and 33, the same reference characters designate these parts, which are identical to those used in the eighth embodiment shown in FIG. 18, and a further description thereof can be omitted.

As shown in FIG. 32, the airbag device 236B includes a case 240, an inflator 241 disposed in the case 240, and an airbag 265 initially received in a folded state in the case 240 and adapted to be inflated when supplied with high-pressure gas generated from the inflator 241. The airbag 265 is made of cloth.

The airbag 265 has a guide member 266 disposed therein for guiding the high-pressure gas into an internal space of the airbag 265. The guide member 266 is made of cloth and formed as a separate member structurally independent from the airbag 265. The guide member 266 includes a main tube section 268 of substantially cylindrical configuration connected at one end (proximal end) to the inflator 241 and having defined therein a guide passage 267, and two branch tube sections 269 extending from an intermediate portion of the main tube section 268 in opposite directions along an axis extending perpendicularly to an axis of the main tube section 268. The proximal end of the main tube section 268 is connected by sewing or adhesive bonding to the airbag 265. An outlet opening 271 at the opposite end (distal end) of the main tube section 265 is arranged such that during normal deployment of the airbag 265, the outlet opening 271 is spaced from a front end portion of the airbag 265 located remote from the inflator 241. Distal ends of the branch tube sections 269, 269 are connected by sewing or adhesive bonding to peripheral edges of two diametrically opposed connecting holes 272 formed in the airbag 265. Thus, the distal ends of the branch tube sections 269 open to the outside air. The main tube section 268 and the respective branch tube sections 269 may be formed either as separate members structurally independent from each other and assembled or joined together to form a guide member 266, or as a single member of unitary structure solely forming a guide member 266. In the former case, the main tube section 268 and the branch tube sections 269 may be formed from the same material or different materials.

The guide passage 267 is defined by an inner peripheral surface of the main tube section 268 for the purpose of guiding the high-pressure gas generated from the inflator 241 into the airbag 265. The main tube section 268 has a tubular shape so that the guide passage 267 defined therein includes a flow control portion 274 disposed adjacent to the inflator 241 for rectifying flow of the high-pressure gas generated from the inflator 241 and directing the high-pressure gas toward the airbag 265. The branch tube sections 269 each have defined therein a branch passage 276 branched off from the guide passage 267 at a portion downstream of the flow control portion 274 for allowing the high-pressure gas to escape from the airbag 265 through the branch passage 276. To this end, the branch tube sections 269 have discharge openings 275 at the distal ends thereof.

The main tube section 268 has a constricted portion 278 located immediately upstream of upstream ends of the respective branch tube sections 269. The constricted portion 278 has a smaller diameter than other portions of the main tube section 268. As a result of formation of the constricted portion, the guide passage 267 has a convergent portion 279 disposed upstream of the branch passages 276 and having a diameter reducing progressively in a direction toward the branch passages 276.

The airbag 265 has a plurality (two in the illustrated embodiment) of vent holes 280 formed therein to provide a fluid communication between the interior and exterior of the airbag 265. The vent holes 280 are located on one side of the connecting holes 272 opposite to the inflator 241.

The airbag 265 including the guide member 266 of the foregoing construction is received in a folded condition in the case 240 together with the inflator 241 to complete an airbag module or device 236B. The airbag device 236B is installed in the dashboard of a motor vehicle in a same manner as shown in FIG. 17. In a car crash when acceleration of gravity not lower than a predetermined level is detected, the inflator 241 is fired to inflate the airbag 265 with high-pressure gas generated from the inflator 241. The airbag 265 breaks the case 240, splits open a cover of the dashboard, and immediately begins to deploy into a passenger compartment.

During deployment, if inflation of the airbag 265 proceeds without involving undesired interruption, deployment operation proceeds normally. In this case, as shown in FIG. 32, high-pressure gas generated from the inflator 241 is guided by the guide passage 267 defined in the main tube section 268 of the guide member 266 and introduced therefrom into the airbag 265 via the outlet opening 271. The airbag 265 immediately begins to inflate. In this instance, since the flow control portion 274 of the guide passage 247 rectifies flow of the high-pressure gas and directs the high-pressure gas toward the airbag 265, the high-pressure gas is no longer possible to enter the branch passages 276 because the branch passages 276 are oriented in a different direction from a desired direction of flow assigned by the flow control portion 274. Furthermore, the high-pressure gas, which has been rectified and oriented by the flow control portion 274, is accelerated by the convergent portion 279, so that the high-pressure gas flows downstream toward the airbag 265 in a convergent manner. Thus, inflation of the airbag 265 proceeds smoothly and rapidly.

Alternatively, if inflation of the airbag 265 involves undesired interruption caused by an obstacle such as a package B as shown in FIG. 33, the airbag 265 itself closes the outlet opening 271 of the main tube section 268 of the guide member 266 whereupon the high-pressure gas is discharged from the branch passages 276 to the outside of the airbag 265. By thus releasing the high-pressure gas, further inflation of the airbag 265 does not take place.

It will be appreciated that the airbag device 236B includes a flow control portion 274 provided in the guide passage 247 of the main tube section 268 for rectifying flow of the high-pressure gas generated by the inflator 241 and directing the high-pressure toward the airbag 265, and branch passages 276 disposed downstream of the flow control portion 274 and branched off from the flow control portion 274 in a different direction headed away from the airbag 265 for allowing the high-pressure gas to escape from the airbag 265. With this arrangement, under normal deployment condition, the high-pressure gas, which has been rectified and directed toward the airbag 265 by means of the flow control portion 274, is prevented from entering the branch passages 276. Thus, the high-pressure gas is introduced into the airbag 265 smoothly and efficiently, causing the airbag 265 to inflate quickly and efficiently. Alternatively, if inflation of the airbag 265 involves undesired interruption caused by an obstacle such as a package B (FIG. 33), the outlet opening 271 of the guide passage 267 is closed by the bag 265 itself whereupon the high-pressure gas is discharged from the branch passages 267 to the outside of the airbag 265. By thus venting the airbag 265, undesired further inflation of the airbag 265 does not take place.

Furthermore, since the guide passage 267 has a tubular shape, it is readily possible to arrange the flow control portion 274 in the proximity of the inflator 241 to thereby shorten the distance between the inflator 241 and the branch passages 276. With this arrangement, undesired inflation of the airbag 265 can be avoided even when a package or the like obstacle is placed close to the airbag 265.

Additionally, by virtue of the convergent portion 279 provided in the guide passage 267 at a portion upstream of the branch passages 276, the high-pressure gas, which has been rectified and directed toward the airbag 265 by means of the flow control portion 274, is further subjected to acceleration by the convergent portion. With this acceleration, the high-pressure gas flows into the airbag in a convergent manner without entering the branch passages 276. Thus, the airbag inflates rapidly and efficiently.

Moreover, since the guide member 266 including the guide passage 267 and the branch passages 276 is formed as a separate member structurally independent from the airbag 265, the airbag device 236B has a higher degree of freedom in arranging the discharge openings 275 at the distal ends of the branch passages 276.

Figure 34:
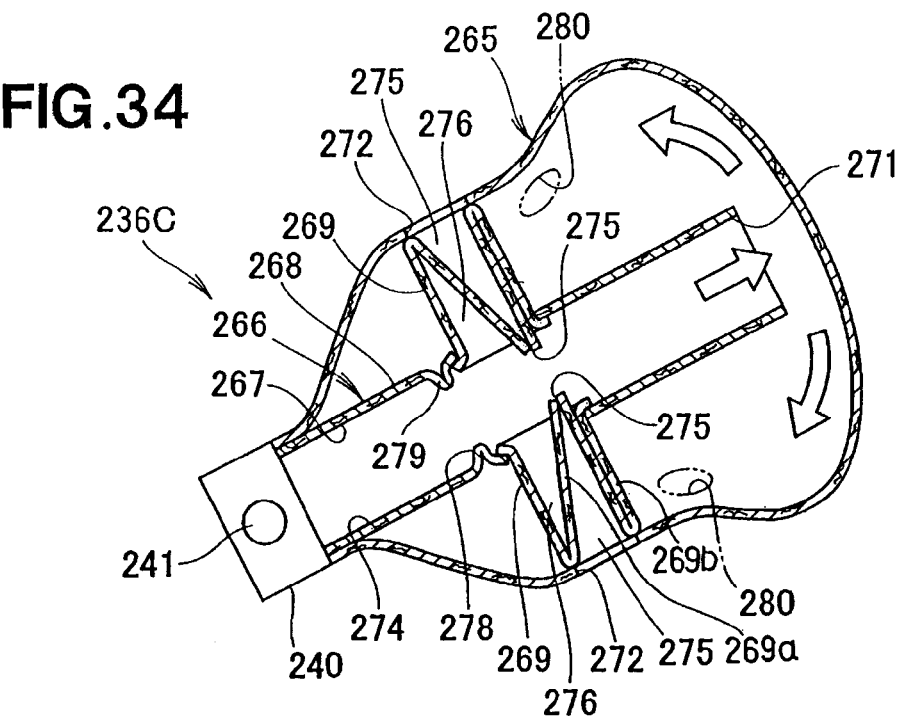
FIG. 34 is a sectional side elevation of an airbag device according to an eleventh embodiment of the present invention, the view showing the airbag device as it deploying under normal conditions.
Figure 35:
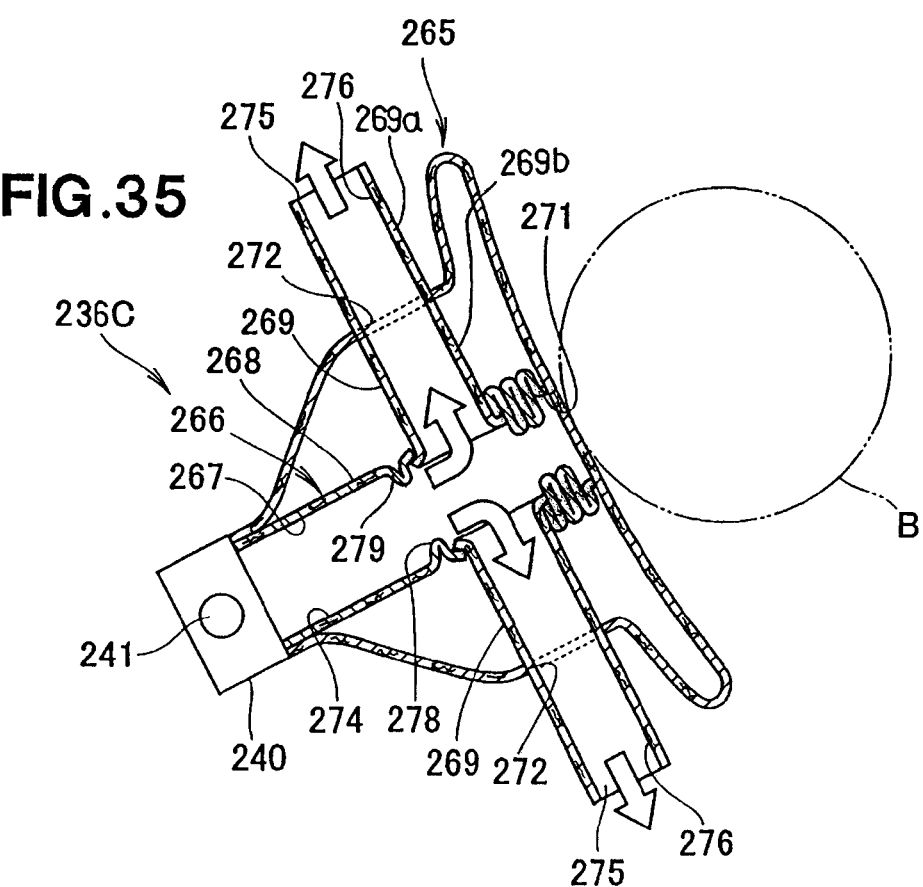
FIG. 35 is a view similar to FIG. 34, but showing the airbag device as it is deploying under unusual condition.

Next, an airbag device according to an eleventh embodiment of the present invention will be described below with reference to FIGS. 34 and 35. In FIGS. 34 and 35, the same reference characters designate these parts, which are identical to those used in the tenth embodiment shown in FIGS. 32 and 33, and a further description thereof can be omitted.

As shown in FIG. 34, the airbag device 236C in this embodiment differs in the structure of the branch passages 269 from the airbag device 236B of the preceding embodiment shown in FIG. 32. In the airbag device 236C shown in a deployed state in FIG. 34, the branch tube sections 269 having defined therein the branch passages 276 have a length about two-times as large as the length of the branch passages 276 shown in FIG. 32. Each of the branch tube sections 269 is normally folded back about a longitudinal central portion thereof in a way that a front half or part 269a of the branch tube section 269, which is disposed downstream of a base half or part 269b of the same branch tube section 269, is received in the base part 269b with a discharge opening 275 located inside the main tube section 268 and with the folded central portion held in contact with peripheral edge of the connecting hole 272 formed in the airbag 265.

In the case where deployment operation proceeds normally without involving undesired interruption of inflation of the airbag 265, the front parts 269a of the branch tube sections 269 are distorted to close the discharge openings 275, as shown in FIG. 34, under the effect of a pressure exerted by the high-pressure gas flowing downstream along the guide passage 267 of the main tube section 268. With the discharge openings 275 thus closed, it is no longer possible for the high-pressure gas to enter the branch passages 276, so that the airbag inflates rapidly and efficiently.

Alternately, if inflation of the airbag 265 involves undesired interruption caused by an obstacle such as a package B, the branch tube sections 269 are unfolded or spread out as shown in FIG. 35 due to an undue pressure rise created within the airbag 265. In this spread or unfolded position, the front parts 269a of the branch tube sections 269 project outward from the connecting holes 272 to the outside of the airbag 265 so that the high-pressure gas is immediately discharged from the airbag 365 through the branch passages 276. By thus venting the airbag 265, further inflation of the airbag 265 does not take place.

Figure 36:
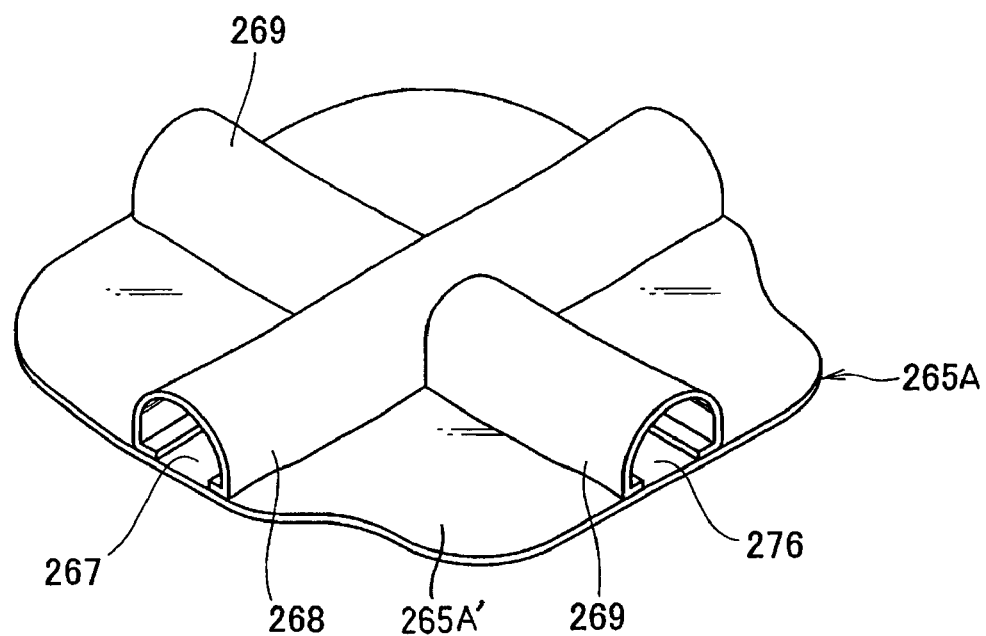
FIG. 36 is a perspective view showing a modified form of the airbag according to the present invention.

FIG. 36 shows in perspective a modified form of the airbag according to the present invention. The modified airbag 365A shown in FIG. 36 differs from the airbag 256 of the embodiment shown in FIG. 32 in that the guide passage 267 and the branch passages 276 are at least partially formed by the airbag 265A. More particularly, a main tube section 268 is formed from a strip of cloth round into a half-round or semicylindrical configuration. Opposite longitudinal edges of the semicylindrical main tube section 268 are connected by sewing or adhesive bonding to a foundation fabric 265A' of the airbag 265A. Similarly, a pair of branch tube sections 269, 269 is also formed from a strip of cloth round into a half-round or semicylindrical configuration. Opposite longitudinal edges of each of the semicylindrical branch tube sections 269 are connected by sewing or adhesive bonding to the foundation fabric 265A' of the airbag 265A. With this arrangement, the guide passage 267 is defined between the semicylindrical main tube section 268 and the foundation fabric 265A' of the airbag 265A, and the branch passages 276 are defined between the semicylindrical branch tube sections 269 and the foundation fabric 265A' of the airbag 265A. Use of the foundation fabric 262A' of the airbag 265A in forming the guide passage 267 and the branch passages 276 makes the airbag 26A less bulky as a while, which allows for compact folding of the airbag 265A.

Figure 37:
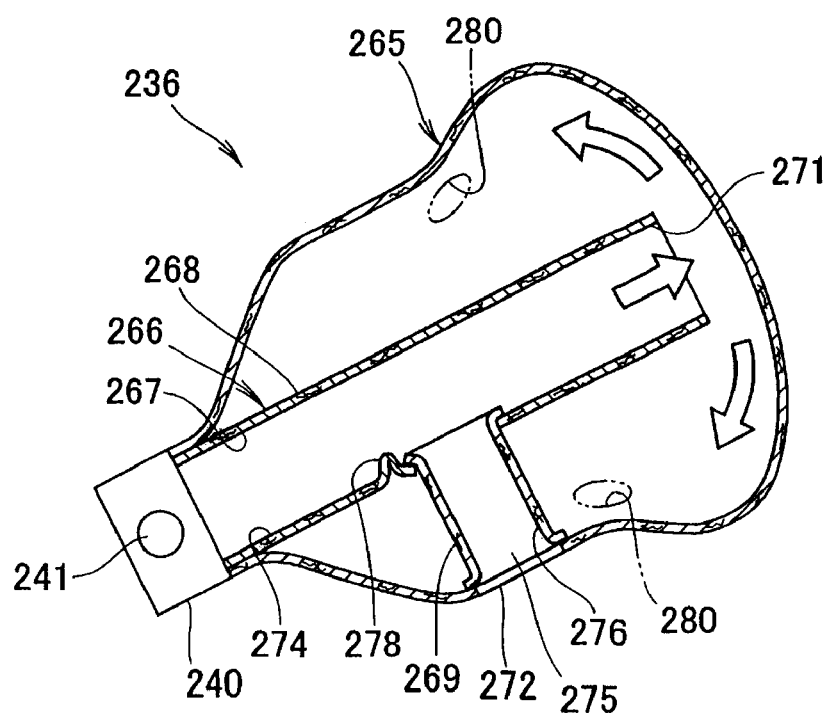
FIG. 37 is a view similar to FIG. 32, but showing a modification according to the present invention.
Figure 38:
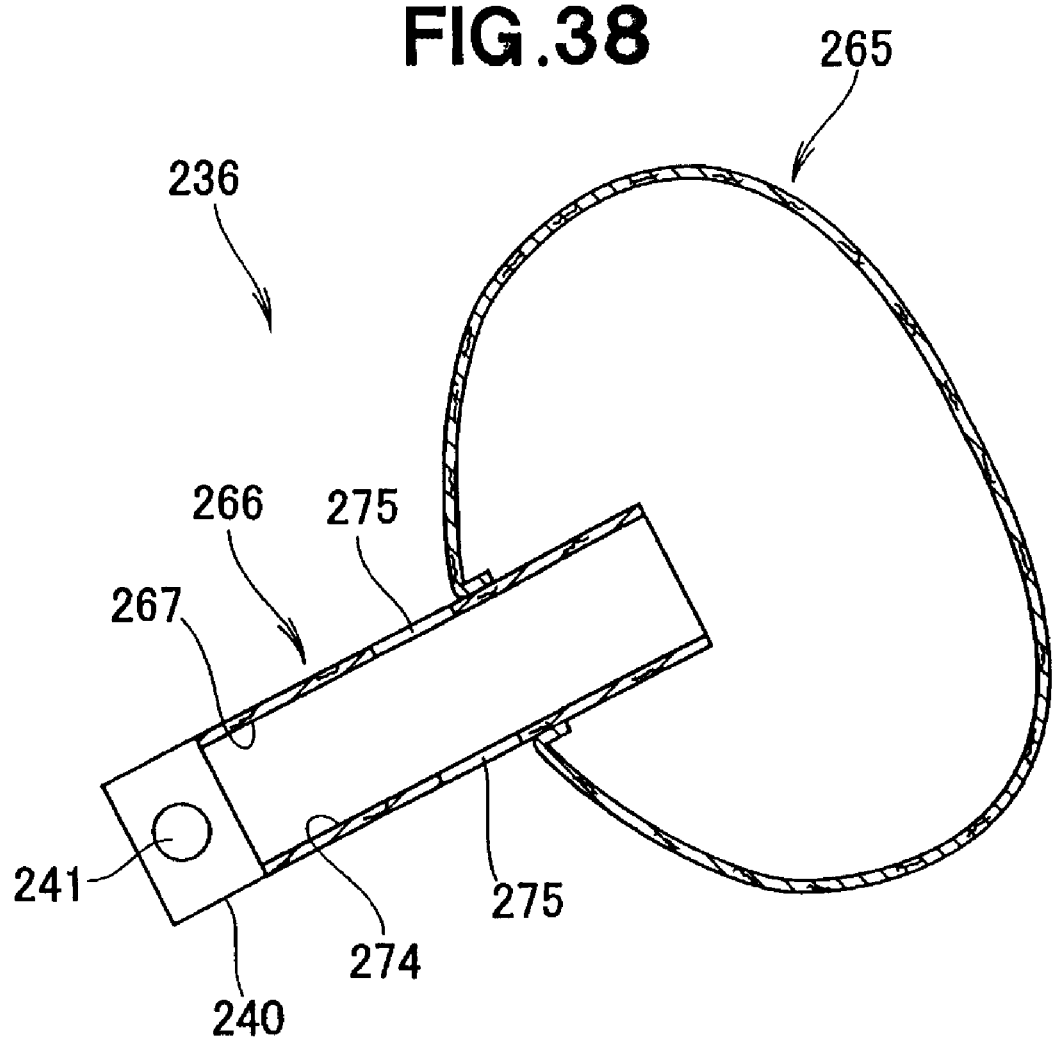
FIG. 38 is a sectional side elevation showing still another modification according to the present invention.
Figure 39:
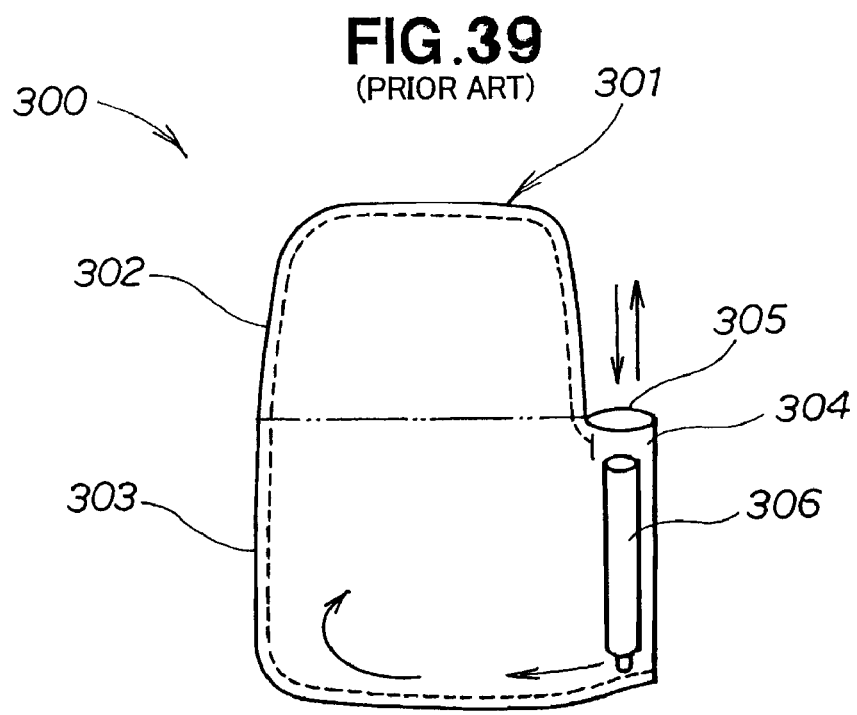
FIG. 39 is a front view showing a conventional airbag device having an aspiratory function.
Figure 40:
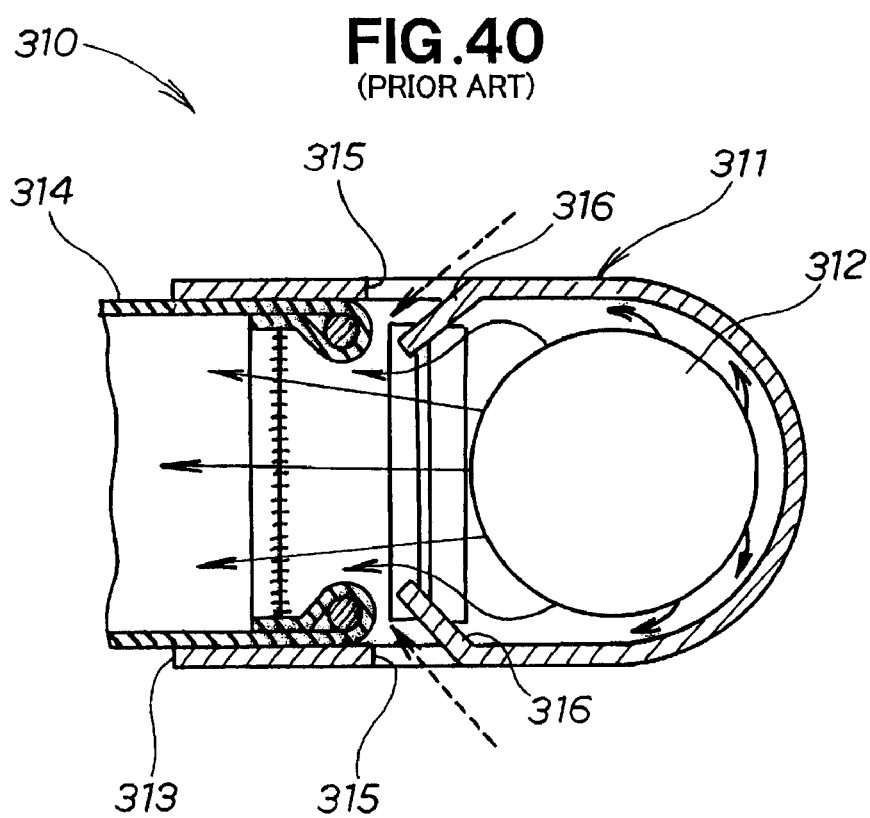
FIG. 40 is a cross-sectional view showing another conventional airbag device having an aspiratory function.

In the embodiments shown in FIGS. 33-33, 34-35 and 36, the number of branch tube section 269 used to form the branch passage 276 should by no means be limited to two as in the illustrated embodiments but may be one as shown in FIG. 37, or alternatively three or more branch tube sections can be used. Furthermore, the guide member 266 may be arranged to project outward from the airbag 265, as shown in FIG. 38. A projecting part of the guide member 266 is connected at its distal end to an inflator 241 and has a pair of discharge openings 275 formed therein for discharging high-pressure gas from the airbag 265. In this arrangement, the discharge openings 275 serve as branch passages.

While in the illustrated preferred embodiments, passenger-side airbag modules or devices have been described as embodying the present invention, this invention may be also practiced or embodied in other types of airbag modules or devices including driver-side airbag modules. The first bag 224 and the second bag 245 shown in FIGS. 18-25 may be made either from the same material, or alternatively from different materials. Similarly, the guide member 246 and the airbag 245 may be made from either the same material or different materials.

Obviously, various minor changes and modifications of the present invention are possible in light of the above teaching. It is therefore to be understood that within the scope of the appended claims the invention may be practiced otherwise than as specifically described.

What is claimed is:

1. An airbag device for a vehicle, comprising:
an airbag which can be inflated to restrain an occupant of the vehicle against the impact of a collision;
an inflator for generating gas to inflate the airbag; and
a guide passage provided between the inflator and the airbag for guiding the gas into the airbag, the guide passage having an inlet opening which faces the inflator and an outlet opening which faces an interior of the airbag, the guide passage extending into the interior of the airbag such that the outlet of the guide passage is disposed in the interior of the airbag,
wherein the airbag has at least one opening formed therein to provide fluid communication between the interior of the airbag and an exterior of the airbag, the at least one opening being disposed near the guide passage such that air is drawn into the airbag via the at least one opening by gas flowing out of the guide passage outlet opening.

2. The airbag device according to claim 1, wherein the guide passage is formed as an integral part of the airbag.

3. The airbag device according to claim 2, further comprising a gas storage chamber disposed between the inflator and the guide passage for temporarily storing therein the gas discharged from the inflator.

4. The airbag device according to claim 1, wherein the airbag further has a flexible tubular member connected at one end to a peripheral edge of the at least one opening, the flexible tubular member being deformable to assume an aspirating position projecting into the airbag when the airbag is to be deployed.

5. The airbag device according to claim 4, wherein the tubular member is tapered and has an large end a small end opposite the large end, the large end being connected to the peripheral edge of the at least one opening.

6. The airbag device according to claim 1, wherein the at least one opening formed in the airbag comprises a tubular duct having an end connected to the airbag and facing an internal space of the airbag to provide a fluid communication between the interior and exterior of the airbag.

7. The airbag device according to claim 6, wherein the tubular duct is provided with a one-way valve for automatically blocking flow of fluid in one direction headed away from the airbag while allowing flow in the opposite direction headed toward the airbag.

8. The airbag device according to claim 1, further comprising a case, wherein the inflator is received in the case and the guide passage extends from the case and is formed as an integral part of the case.

9. The airbag device according to claim 1, wherein the outlet opening of the guide passage is smaller in size than the inlet opening.

10. The airbag device according to claim 9, wherein the guide passage is tapered and has a large end and a small end opposite the large end, the large end having the inlet opening formed therein, and the small end having the outlet opening formed therein.

11. The airbag device according to claim 9, wherein the guide passage is flared at an end thereof, the flared end having the inlet opening formed therein.

12. The airbag device according to claim 1, wherein the guide passage has a flow control portion for rectifying flow of the gas generated by the inflator and directing the gas toward the airbag, and a branch passage is provided downstream of, and branched off from, the flow control portion for allowing the gas to escape from the airbag.

13. The airbag device according to claim 12, wherein the guide passage is formed by a first bag into which the gas is directly supplied from the inflator, the flow control portion is formed on an end of the first bag opposite the inflator, wherein the airbag comprises a second bag into which the gas is supplied through the flow control portion of the first bag, and wherein the branch passage is provided between the first bag and the second bag and includes an on-off valve operable to discharge the gas from the airbag through the branch passage.

14. The airbag device according to claim 13, wherein a plurality of on-off valves is provided and the first bag and the second bag are joined together at portions located between the adjacent on-off valves.

15. The airbag device according to claim 14, wherein the at least one opening is formed in the second bag and located adjacent to each of the on-off valves.

16. The airbag device according to claim 13, wherein the at least one opening is formed in the second bag and located adjacent to the on-off valve.

17. The airbag device according to claim 12, wherein the guide passage has a tubular shape.

18. The airbag device according to claim 17, wherein the guide passage has a convergent portion disposed upstream of the branch passage.

19. The airbag device according to claim 17, wherein the branch passage is formed by a branch section, the branch section being inwardly folded back about an intermediate portion thereof.

20. The airbag device according to claim 17, wherein the guide passage and the branch passage are formed by separate members disposed inside the airbag and structurally independent from the airbag.

21. The airbag device according to claim 17, wherein the guide passage and the branch passage are at least partially formed by the airbag.

22. The airbag device according to claim 1, wherein the at least one opening in the airbag is provided at a position relatively between the guide passage inlet opening and the guide passage outlet opening.

23. An airbag device for a vehicle, comprising:
an airbag which can be inflated to restrain an occupant of the vehicle against the impact of a collision;
an inflator for generating gas to inflate the airbag; and
a guide passage provided between the inflator and the airbag for guiding the gas into the airbag,
wherein the airbag has at least one opening formed therein to provide a fluid communication between an interior and an exterior of the airbag, the at least one opening being disposed near the guide passage,
wherein the guide passage has a flow control portion for rectifying flow of the gas generated by the inflator and directing the gas toward the airbag, and a branch passage is provided downstream of, and branched off from, the flow control portion for allowing the gas to escape from the airbag, and the guide passage is formed by a first bag into which the gas is directly supplied from the inflator, the flow control portion is formed on an end of the first bag opposite the inflator, wherein the airbag comprises a second bag into which the gas is supplied through the flow control portion of the first bag, and wherein the branch passage is provided between the first bag and the second bag and includes an on-off valve operable to discharge the gas from the airbag throuah the branch passage,
wherein the branch passage and the on-off valve are formed by and between a first communicating hole part projecting from the first bag into the second bag and forming the flow control portion and a second communicating hole part projecting from the second bag into an internal space of the second bag, the first communicating hole part and the second communicating hole part being overlapped with each other so that a gap can be formed between the first and second communicating hole parts.

24. The airbag device according to claim 23, wherein the first communicating hole part and the second communicating hole part are connected together by adhesive bonding at their respective portions spaced at intervals in a circumferential direction of the first and second communicating hole parts.

25. The airbag device according to claim 23, wherein the first communicating hole part and the second communicating hole part are connected together by sewing stitches extending over the entire circumferences of the first and second communicating hole parts.

26. The airbag device according to claim 23, wherein the first bag and the second bag are connected together by straps extending therebetween and arranged at regular intervals around the first and second communicating hole parts while the first and second communicating hole parts are kept in an overlapped condition.

* * * * *

UNITED STATES PATENT AND TRADEMARK OFFICE
CERTIFICATE OF CORRECTION

| | |
|---|---|
| PATENT NO. | : 7,325,830 B2 |
| APPLICATION NO. | : 11/470063 |
| DATED | : February 5, 2008 |
| INVENTOR(S) | : Higuchi et al. |

It is certified that error appears in the above-identified patent and that said Letters Patent is hereby corrected as shown below:

Column 30, Line 12, insert the following

--27. An airbag device for a vehicle, comprising:
an airbag which can be inflated to restrain an occupant of the vehicle against the impact of a collision;
an inflator for generating gas to inflate the airbag;
a guide passage provided between the inflator and the airbag for guiding the gas into the airbag; and
at least one opening formed in the airbag, the at least one opening being positioned and adapted to draw air from outside of the airbag into the airbag due to gas flowing out of the guide passage and into the airbag during airbag inflation so as to facilitate airbag inflation.--

Signed and Sealed this

Twenty-seventh Day of May, 2008

JON W. DUDAS
*Director of the United States Patent and Trademark Office*